(12) United States Patent
Thompson

(10) Patent No.: US 11,280,405 B2
(45) Date of Patent: Mar. 22, 2022

(54) TRANSMISSION FOR BLOCKING UPSHIFTS AND DOWNSHIFTS UNDER CERTAIN TORQUE CONDITIONS

(71) Applicant: QinetiQ Limited, Hampshire (GB)

(72) Inventor: Robert William Thompson, Camberley (GB)

(73) Assignee: QINETIQ LIMITED, Hampshire (GB)

( * ) Notice: Subject to any disclaimer, the term of this patent is extended or adjusted under 35 U.S.C. 154(b) by 467 days.

(21) Appl. No.: 16/330,553

(22) PCT Filed: Sep. 5, 2017

(86) PCT No.: PCT/EP2017/072264
§ 371 (c)(1),
(2) Date: Mar. 5, 2019

(87) PCT Pub. No.: WO2018/042057
PCT Pub. Date: Mar. 8, 2018

(65) Prior Publication Data
US 2021/0285539 A1   Sep. 16, 2021

(30) Foreign Application Priority Data

Sep. 5, 2016 (GB) ...................................... 1615046
Nov. 9, 2016 (GB) ...................................... 1618911

(51) Int. Cl.
*F16H 61/18* (2006.01)
*F16H 61/16* (2006.01)
*F16H 61/684* (2006.01)
(Continued)

(52) U.S. Cl.
CPC ............. *F16H 61/18* (2013.01); *F16H 3/091* (2013.01); *F16H 61/16* (2013.01); *F16H 61/684* (2013.01);
(Continued)

(58) Field of Classification Search
CPC .......... F16H 61/18; F16H 3/091; F16H 61/16; F16H 61/684; F16H 63/08; F16H 2061/163
(Continued)

(56) References Cited

U.S. PATENT DOCUMENTS 3,498,155 A * 3/1970 Jones ...................... F16H 63/44
74/745
3,743,067 A * 7/1973 Bokovoy ................ F16D 41/22
192/43
(Continued)

FOREIGN PATENT DOCUMENTS

EP    2901045 A1    8/2015
JP    2012127471 A   7/2012
(Continued)

OTHER PUBLICATIONS

International Search Report and Written Opinion for PCT Patent App. No. PCT/EP2017/072264 (dated Nov. 28, 2017).
(Continued)

*Primary Examiner* — Ha Dinh Ho
(74) *Attorney, Agent, or Firm* — Kenealy Vaidya LLP

(57) ABSTRACT

Some embodiments are directed toward a transmission having a torque input and output, drive members selectively engageable for sequentially changing gear ratio between the torque input and output, the transmission also having a shaft with a shifting feature. The transmission includes a drum having a track around its outer perimeter and arranged such that torque can be transferred by rotating the shaft, the drum capable of being moved along the length of the shaft, a biasing mechanism for urging the drum towards a rest position along the length of the shaft, and a drive member selector member provided in operative relation to the track, wherein by rotating the shaft the drive member selector member can be selectively urged into contact with a first
(Continued)

drive member for drivingly engaging therewith in a first torque connection or into contact with a second drive member for drivingly engaging in a second torque connection.

19 Claims, 17 Drawing Sheets

(51) Int. Cl.
  *F16H 63/08* (2006.01)
  *F16H 3/091* (2006.01)
(52) U.S. Cl.
  CPC ....... *F16H 63/08* (2013.01); *F16H 2061/163* (2013.01)
(58) Field of Classification Search
  USPC .......................................................... 74/363
  See application file for complete search history.

(56) References Cited

U.S. PATENT DOCUMENTS

| | | | |
|---|---|---|---|
| 4,096,932 A | 6/1978 | Liberty, Jr. | |
| 7,766,779 B2 * | 8/2010 | Belmont | F16H 63/30 475/5 |
| 9,759,290 B2 * | 9/2017 | Glover | F16H 3/006 |
| 10,066,747 B2 * | 9/2018 | Takeuchi | F16D 21/04 |
| 10,619,708 B2 * | 4/2020 | Thompson | F16H 3/0915 |
| 10,788,125 B2 * | 9/2020 | Takeuchi | F16H 3/0915 |

FOREIGN PATENT DOCUMENTS

| | | |
|---|---|---|
| JP | 2015081634 A | 4/2015 |
| WO | WO2014049317 A1 | 4/2014 |
| WO | WO2016/055304 A1 | 4/2016 |
| WO | WO2017/016869 A1 | 2/2017 |

OTHER PUBLICATIONS

Search Report from GB Patent App. No. 1618911.0 (dated Apr. 27, 2017).

Apr. 30, 2021 Official Action issued in corresponding Japanese Patent Application No. 2019-512664 (with English anguage translation).

\* cited by examiner

TRANSMISSION FOR BLOCKING UPSHIFTS AND DOWNSHIFTS UNDER CERTAIN TORQUE CONDITIONS

CROSS REFERENCE TO RELATED APPLICATIONS

This application is a national phase filing under 35 C.F.R. § 371 of and claims priority to PCT Patent Application No. PCT/EP2017/072264, filed on Sep. 5, 2017, which claims the priority benefit under 35 U.S.C. § 119 of British Patent Application No. 1615046.8, filed on Sep. 5, 2016, and British Patent Application No. 1618911.0, filed on Nov. 9, 2016 the contents of each of which are hereby incorporated in their entireties by reference.

BACKGROUND

Some embodiments relate to transmissions, in particular blocking upshifts and downshifts in certain torque conditions during use.

WO2016/055304A1 concerns gearboxes and page 6, line 30 to page 19, line 26 describes the gearbox 1 in FIG. 1 herein. It includes a series of shift mechanisms 2 for implementing gear shifts. A single down-shift or a single up-shift can be preselected in use, although preselecting more than one up-shift or more than one down-shift is prevented by a gate 3 which is arranged to cooperate with selector drums 4 of the respective shift mechanisms 2. WO2016/055304A1 describes this functionality in the passages on page 19, lines 4 to 25 and page 22, line 18 to page 23, line 6. Since pre-selection of a gear could lead to an engine over speed occurring, particularly in the case of a gearbox which is manually operated, aspects of the presently disclosed subject matter are conceived to address this.

SUMMARY

According to an aspect of the presently disclosed subject matter there is provided a transmission having a torque input and a torque output, a plurality of drive members that are selectively engageable for sequentially changing gear ratio between the torque input and the torque output, the transmission also having a shaft provided with at least one shifting feature each of which includes a drum having a track at least partially around its outer perimeter and arranged such that torque can be transferred thereto by rotating the shaft, the drum also capable of being moved along the length of the shaft; a biasing mechanism for urging the drum towards a rest position along the length of the shaft; and a drive member selector member provided in operative relation to said track, wherein by rotating the shaft the drive member selector member can be selectively urged into contact with a first said drive member for drivingly engaging therewith in a first torque connection or into contact with a second said drive member for drivingly engaging therewith in a second torque connection, the first and second torque connections being in opposite directions; wherein each respective said shifting feature is configured such that when the drive member selector member thereof is drivingly engaged with a said drive member in either a positive or negative torque condition of the transmission in use, rotation of the shaft is blocked in one direction whereby a blocking condition occurs part way between an initial rotational position of the shaft and a rotational position in which the next sequentially selectable gear ratio would be caused to be engaged if the torque condition of the transmission was reversed.

Each respective said shifting feature may be configured such that when the drive member selector member thereof is drivingly engaged with a said drive member in a positive torque condition of the transmission a downshift to a lower said selectable gear ratio is blocked.

Each respective said shifting feature may be configured such that when the drive member selector member thereof is drivingly engaged with a said drive member in a negative torque condition of the transmission an upshift to a higher said selectable gear ratio is blocked.

Each respective said shifting feature may be configured such that in a blocking condition thereof a first blocking feature of the drum engages a second blocking feature of the transmission for preventing rotation of the shaft in the direction blocked.

The second blocking feature may be received in a first space on one side of the drum such that an operative surface of the first blocking feature engages the second blocking feature.

The first space may be a recess in a side of the drum and the operative surface of the first blocking feature may define a side or bottom face of this recess.

The second blocking feature of the transmission may be wedge shaped and an operative surface thereof may lie in flush engagement with the first blocking feature.

Each respective said shifting feature may be configured such that in a pre-synchronisation condition thereof upon changing gear ratio in use, the second blocking feature is received in a second space on the other side of the first blocking feature.

The second space may be another recess in the side of the drum.

The second space may be a V-shaped recess.

The second blocking feature of the transmission may form part of a casing of the transmission.

According to another aspect of the presently disclosed subject matter there is provided a vehicle including a transmission according to any type heretofore described.

Each respective said shifting feature may be configured such that when the positive torque condition of the transmission is reversed the downshift to a lower said selectable gear ratio is no longer blocked.

Each respective said shifting feature may be configured such that when the negative torque condition of the transmission is reversed the upshift to a higher said selectable gear ratio is no longer blocked.

Each respective said shifting feature may be configured such that when a blocking condition is stopped a first blocking feature of the drum disengages a second blocking feature of the transmission for allowing rotation of the shaft in the direction previously blocked.

The first and second blocking features may include respective operative surfaces which may be configured to block a transition between a lower and a higher gear ratio when the transmission is in an adverse torque condition. The respective operative surfaces may be further configured to allow a subsequent transition between a lower and a higher gear ration when the transmission is no longer in an adverse torque condition.

The first and second blocking features may include respective operative surfaces which may be configured to allow a gear transition when an adverse torque condition of the transmission is removed or no longer present.

The adverse torque condition may be defined as i) a negative torque condition when the gear change or transition is from a lower to a higher gear ratio and/or ii) a positive torque condition when the gear change or transition is from a higher to a lower gear ratio.

The first blocking feature of the selector drum may include first and second angled surfaces, at least one of which may be configured to engage the second blocking feature of the transmission for preventing rotation of the shaft in the direction blocked. The engaging surface of the first blocking feature may be an operative surface of the first blocking feature.

The second blocking feature of the transmission may include first and second angled surfaces, at least one of which may be configured to engage the first blocking feature of the selector drum for preventing rotation of the shaft in the direction being blocked. The engaging surface of the second blocking feature may be an operative surface of the second blocking feature.

The operative surface of the first blocking feature may lie in a plane which is inclined to a longitudinal axis of the shaft. The incline may be up to 90 degrees. That is, the incline may be perpendicular to a longitudinal axis of the shift shaft. This may facilitate relative movement between the engaging faces on the first and second blocking features. The relative movement between the first and second blocking features may be sliding movement. The operative surfaces of the first and second blocking features may be arranged to resist relative movement when the transmission is in an adverse torque condition. The operative surfaces of the first and second blocking features may be arranged to facilitate relative movement when the adverse torque condition of the transmission has been reversed. That is, the engaging or operative face on the first blocking feature may be arranged to slide relative to the engaging or operative face on the second blocking feature when the adverse torque condition of the transmission has been reversed.

The inclined operative faces facilitate sliding movements of the operative surfaces which helps disengagement when the torque condition is reversed. This is because the first and second blocking features may be allowed to slide past each other, enabling the gear transition to take place.

The engaging, or operative, surfaces of the first and second blocking features may lie in a plane which is inclined to a longitudinal axis of the shaft.

The selector drum may include two first blocking features. The two blocking features of the selector drum may be diametrically opposed to each other. The two blocking features of the selector drum may be positioned substantially opposite each other with respect to an axis of rotation of the selector drum. The two blocking features of the selector drum may be substantially 180° apart from each other with respect to an axis of rotation of the selector drum.

The transmission may include two second blocking features. The two second blocking features of the transmission may be diametrically opposed to each other. The two blocking features of the transmission may be positioned substantially opposite each other around a circumference of the shaft. The two blocking features of the transmission may be substantially 180° apart from each other with respect to an axis of the shift shaft.

The first blocking feature of the selector drum may include a projection.

The second blocking feature of the transmission may include a projection.

The first blocking feature of the selector drum may include a blocking face. The blocking face may extend around a portion of an external surface of the selector drum in a plane perpendicular to an axis of the rotation of the selector drum.

An operative surface of the first blocking feature may define a bottom of a recess in a side of the selector drum.

The second blocking feature of the transmission may include at least one roller. The second blocking feature of the transmission may include two rollers. The two rollers may be diametrically opposed to each other. The two rollers may be positioned substantially opposite each other around a circumference of the shaft. The two rollers may be substantially 180° apart from each other with respect to an axis of the shift shaft.

Each respective shifting feature may be configured such that when the drive member selector member thereof is drivingly engaged with the said drive member in either a positive or negative torque condition of the transmission in use, rotation of the shaft is blocked in one direction whereby the blocking condition occurs and the blocking condition subsequently no longer occurs when the torque condition of the transmission is reversed.

BRIEF DESCRIPTION OF THE DRAWINGS

Embodiments of the presently disclosed subject matter will now be described by way of non-limiting example with reference to the accompanying drawings, in which.

DETAILED DESCRIPTION OF EXEMPLARY EMBODIMENTS

Figure 1:
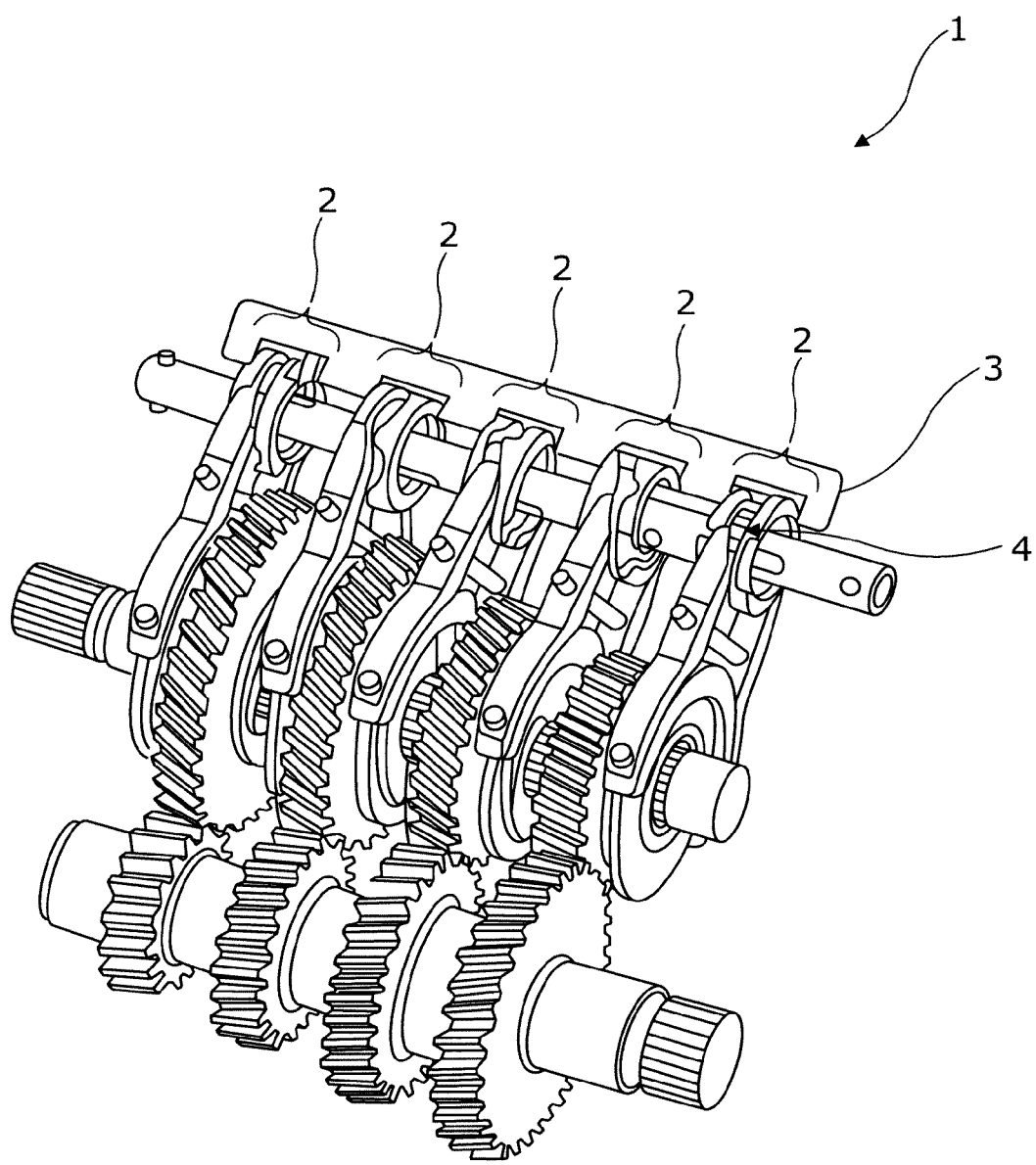
FIG. 1 schematically illustrates a prior art transmission.
Figure 2:
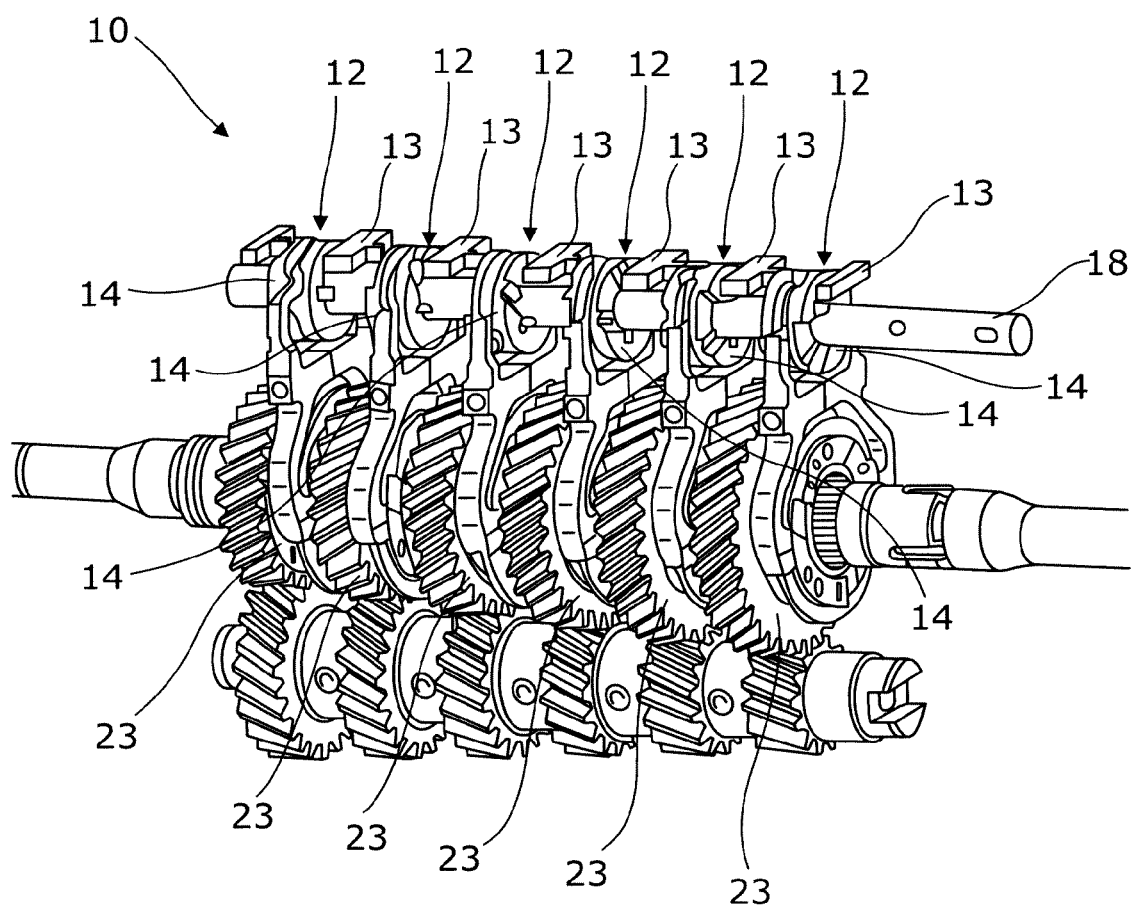
FIG. 2 schematically illustrates a transmission according to an embodiment of the presently disclosed subject matter.
Figure 3:
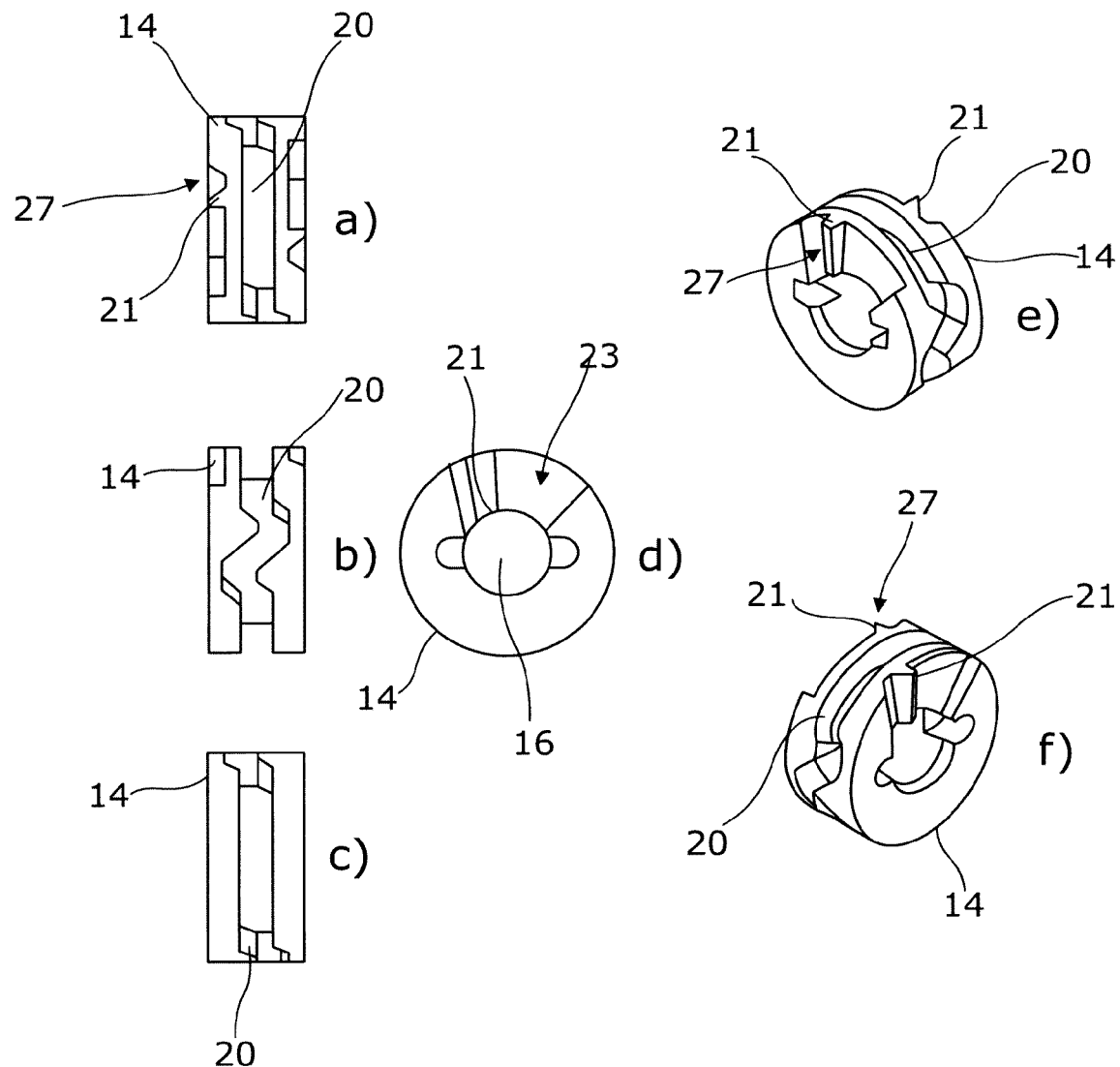
FIGS. 3a to 3f schematically illustrate a selector drum of the transmission of FIG. 2 from various angles.

FIG. 2 shows a transmission 10 essentially similar to that in FIG. 1 herein, described between page 6, line 30 to page 19, line 26 of WO2016/055304A1 the entire contents of this document being incorporated herein by reference. In the transmission 10 of FIG. 2, however, the gate 3 is replaced by a series of blocking portions 13 (which could form part of a casing for the transmission) and also the shift mechanisms 12 differ from those in WO2016/055304A1 in that they each include a different kind of selector drum 14. All or most other elements of the transmission 10 are similar to those in the prior art transmission in FIG. 1 and likewise different gear ratios can be selected in use by twisting the shift shaft 18, the difference being that the transmission 10 blocks certain gear shifts in certain torque conditions which is described in detail below.

FIGS. 3a to 3f illustrate a selector drum 14 of the transmission 10 from different angles. It has an aperture 16 for receiving the shift shaft 18 and is configured to form a spline fit with the shift shaft 18 such that rotating the shift shaft 18 will transfer torque to the selector drum 14, while the selector drum 14 remains free to be moved along the length of the shift shaft 18. Additionally a track 20 is defined by the selector drum 14 which extends at least partially around its outer perimeter and those familiar with WO2016/055304A1 will understand that the purpose of the track 20 is to cause movement of shift arms 12a, b of the associated shift mechanism 12 (see FIGS. 4a and 4c) upon rotating the shift shaft 18 to cause translational movement of the dog hub 3 of that shift mechanism 12.

It will be understood from WO2016/055304A1 that the selector drums 14 of the respective shift mechanisms 12 should be mounted to the shift shaft 18 at different angles relative to each other. This is in order to cause certain dog hubs 3 to be biased towards a gear 23 at different rotational positions of the shift shaft 18. For instance looking at FIG. 4a at this particular rotational position of the shift shaft 18 the tracks 20 of the annotated selector drums 14 force the shift arms 12a, 12b and thereby the dog hubs 3 towards the annotated gear 23 (in this example, fifth gear). However the tracks of the other selector drums do not cause their associated dug hubs to be forced towards the other illustrated gears at this rotational position of the shift shaft 18. In order to up-shift or down-shift from the illustrated gear ratio configuration (fifth gear) the shift shaft 18 is to be rotated to the rotational position that may be required for causing the desired gear 23 to be engaged by its opposing dog hubs 3.

It is hereby mentioned that as similarly described between page 17, line 21 to page 18, line 15 of WO2016/055304A1 the selector drums 14 of the transmission 10 described herein are also biased towards a rest position along the shift shaft 18 by a biasing mechanism such as a spring on either side thereof.

Figure 4:
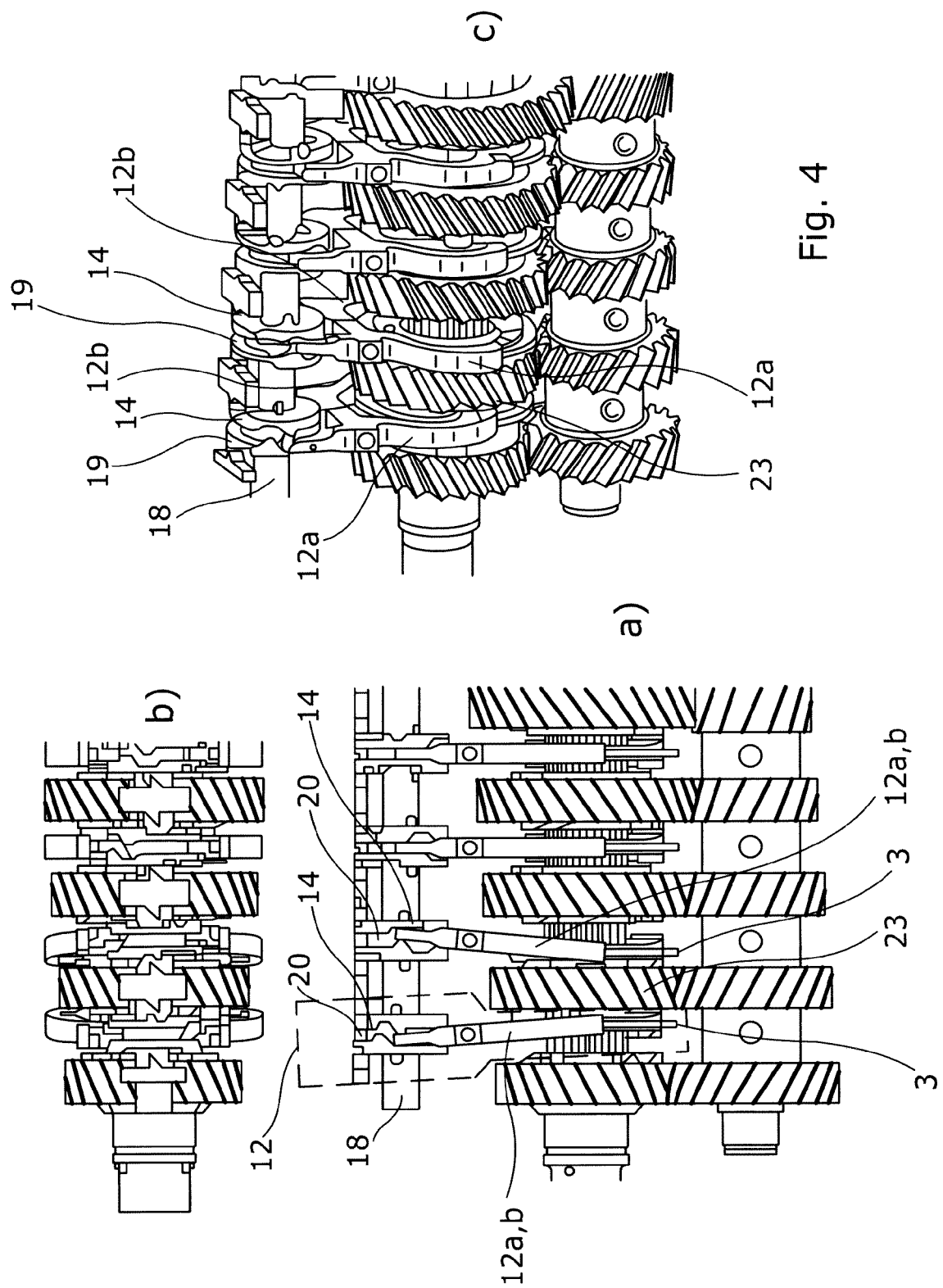
FIGS. 4a to 4c schematically illustrate part of the transmission in FIG. 2 in a fifth gear configuration from different angles.
Figure 5:
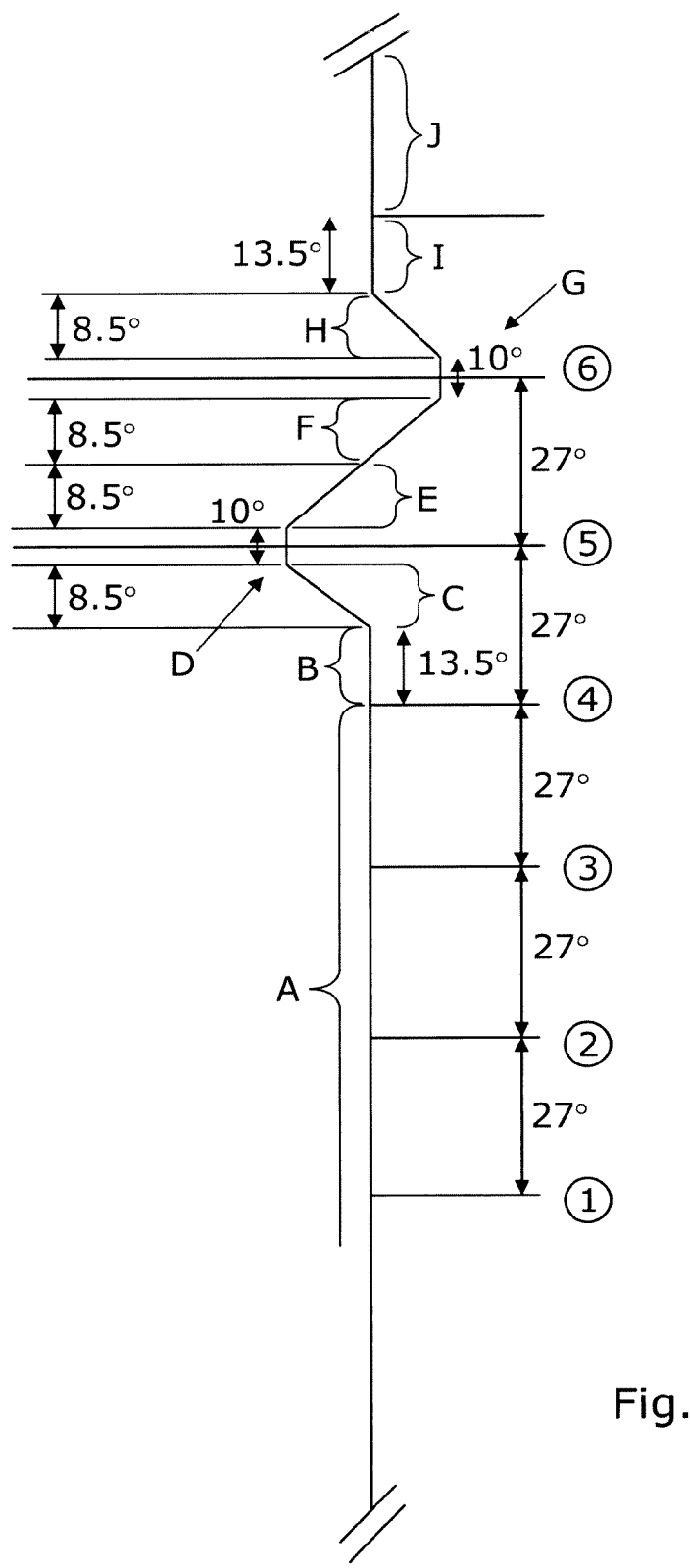
FIG. 5 schematically illustrates a section of the track pattern extending around the perimeter of the selector drum in FIGS. 3a to 3f.

The leftmost selector drum 14 in FIG. 4a will be used to explain aspects of the presently disclosed subject matter. FIG. 5 schematically illustrates details of part of the track 20 for this selector drum 14 having first to tenth track sections A to J, wherein the angular dimensions shown refer to angular displacement around the axis of the shift shaft 18. Pins 19 extend from the associated shift arms 12a, 12b (see FIG. 4c), wherein the track pattern illustrated in FIG. 5 is repeated around the circumference of the selector drum 14 so that the pins 19 extend into corresponding sections of track 20 on opposite sides of the selector drum 14. Continuing with reference to FIG. 5, when the shift shaft 18 is in either of neutral, first, second third or fourth gear rotational positions the pins 19 extending from the shift arms 12a, 12b each extend into a first, non-slanted, section of the track 20 denoted A in FIG. 5, whereby it will be understood that a tangent to the selector drum 14 aligned with this first track section A will extend perpendicularly to the shift shaft 18. This provides that during rotation of the shift shaft 18 from the neutral and through the first to fourth gear rotational positions the leftmost selector drum 14 in FIG. 4a is maintained in a rest position along the length of the shift shaft 18 by the aforementioned biasing mechanism.

With further reference to FIG. 5, upon rotating the shift shaft 18 from the rotational position in which fourth gear is engaged to the rotational position in which fifth gear is engaged, the shift arms 12a, b associated with the leftmost selector drum 14 in FIG. 4a will remain in a neutral position for half of the turning operation (13.5 degrees in this example) since the pins 19 each ride along a second section of track 20 denoted B aligned with the first track section A. However, once the shift shaft 18 is rotated beyond this the pins 19 each ride along a third, slanted, part of the track C for some of the rotation of the shift shaft 18 (the next 8.5 degrees of rotation in this example). A tangent to the selector drum 14 extending along the third track section C will not extend perpendicularly to the shift shaft 18. Beyond the third track section C is a fourth track section D which extends parallel to the first and section track sections A, B circumferentially around the selector drum 14. Thereby upon continued rotation of the shift shaft 18 the pins 19 of the shift arms 12a,b will end up cooperating with respective fourth track sections D on opposite sides of the selector drum 14.

When the pins 19 are caused to ride along the third, slanted, part of the track C by twisting the shift shaft 18, the associated shift arms 12a,b are pivoted towards the fifth gear 23, thus moving the dog hub 3 into engagement with that gear 23. From this it will be appreciated that as the selector drum 14 is rotated by action of twisting the shift shaft 18, a reaction force of the respective track sections C on the pins 19 is transferred to the shift arms 12a, b which causes them to pivot. Looking at FIGS. 4a-c, in these illustrations cooperation of the track 20, pins 19 and shift arms 12a,b has caused the leftmost dog hub 3 to be urged into engagement with the fifth gear 23, wherein the pins 19 extend into respective fourth track sections D on opposite sides of the leftmost selector drum 14.

From the foregoing it will be understood how the other track sections E to J will affect the shift arms 12a, b when the selector drum 14 is rotated further.

It is here mentioned that during rotation of the shift shaft 18 between the fourth and fifth rotational positions as described above the leftmost selector drum in FIG. 4a is maintained in its rest position along the length of the shift shaft 18 by its associated biasing mechanism. The relevance of this and how certain gear shift operations can be blocked is now described.

Blocking Upshift in a Negative Torque Condition

When a vehicle is on trailing throttle a negative torque condition exists in the transmission. For the transmission described in WO2016/055304A1 an upshift can be preselected during a negative torque, trailing throttle, condition. Particularly in the case of a manually operated gearbox this could lead to an inappropriate up shift occurring when the throttle is re-applied.

Figure 6:
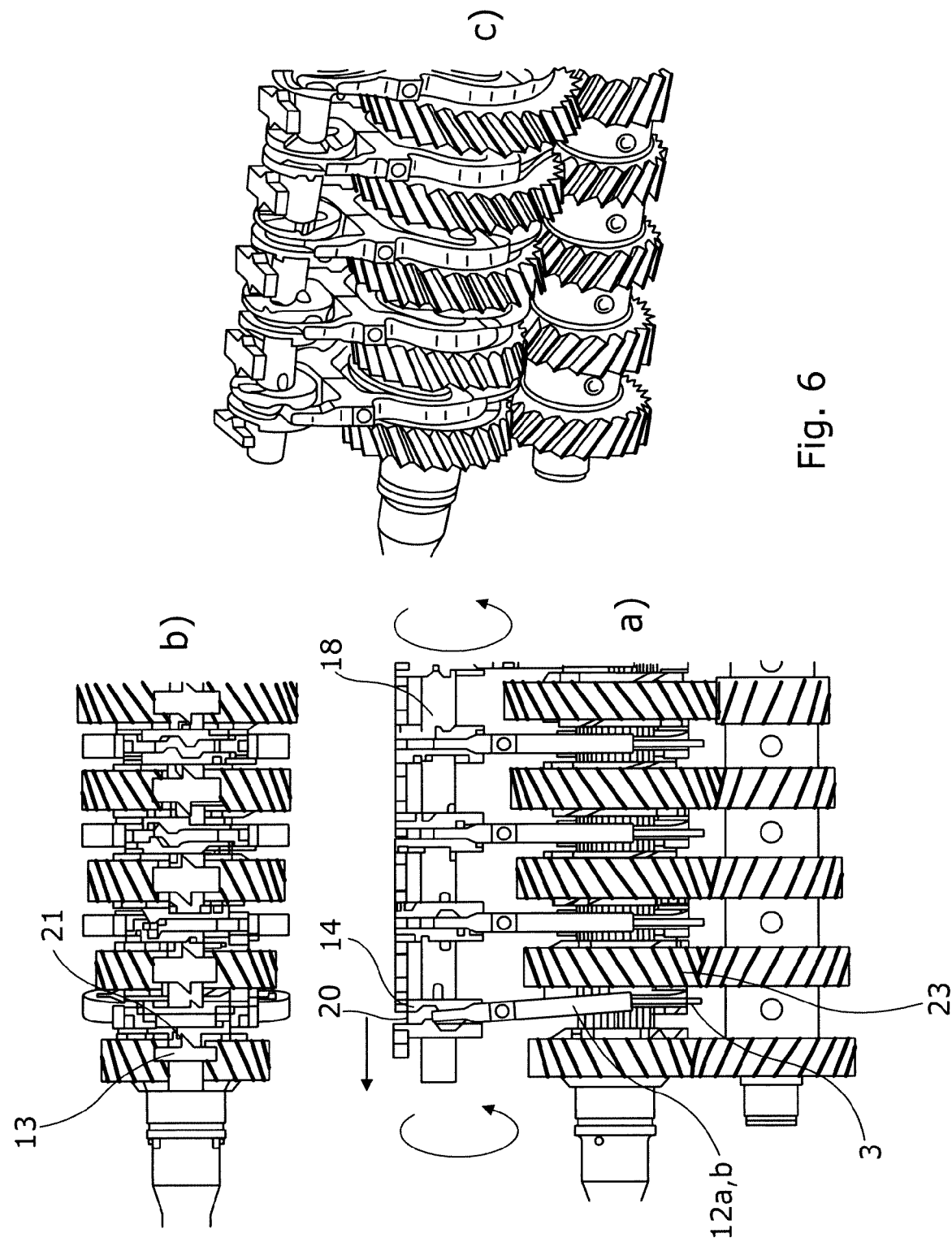
FIGS. 6a to 6c schematically illustrate part of the transmission in FIG. 2 during an upshift from fifth to sixth gear while a negative torque condition exits in the transmission.

Looking at FIG. 6 the shift shaft 18 has been rotated in the direction of the rotational position in which sixth gear would be engaged were the transmission in a positive torque condition and were the blocking operation about to be described not to occur. Comparing FIGS. 4 and 6, dog hubs 3 on the left of the illustrated gears 23 are negative dog hubs (i.e. they become loaded during a negative toque condition of the transmission 10) whereas the dog hubs 3 on the right of the gears 23 are positive dog hubs (i.e. they become loaded during a positive toque condition of the transmission 10). Thus in a negative torque condition the dog hub 3 on the right of the engaged fifth gear 23 in FIG. 4-c is not loaded and so can be urged away from the gear 23 during rotation of the shift shaft 18 to the sixth gear rotational position due to cooperation between the track 20 of the associated selector drum 14 and shift arms 12a, b. However in a negative torque condition the dog hub 3 on the left of the engaged fifth gear 23 in FIGS. 4a-c is loaded and so cannot so easily be separated from the gear 23 during rotation of the shift shaft 18 similarly as described in WO2016/055304A1 which is primarily due to friction between inter-engaging dog teeth.

In view of the above and with continued reference to FIGS. 4a-c and 6a-c, during rotation of the shift shaft 18 from the fifth to sixth gear rotational position the pins 19 extending from the shift arms 12a,b into the track 20 of the left most selector drum 14 are each caused to ride along a fifth, slanted, part of the track E during the first half of the twisting operation towards the sixth gear rotational position (see FIG. 5—in this example the first 13.5 degrees of rotation away from the fifth gear rotational position). A tangent to the selector drum 14 extending along the fifth track section E will not extend perpendicularly to the shift shaft. In a negative torque condition of the transmission 10, however, the leftmost dog hub 3 in FIGS. 4a-c and 6a-c remains loaded and in contact with the fifth gear 23 while the shift shaft 18 is so rotated. As a result this causes the selector drum 14 to be urged along the length of the shift shaft 18 against the aforementioned biasing mechanism when an attempt is made to upshift from fifth to sixth gear by twisting the shift shaft 18.

In more detail, during movement of the selector drum 14, the rotational aspect thereof being due to torque exerted thereon by the shift shaft 18, and the translational aspect thereof being due to a reaction force between the pins 19 extending from the associated shift arms 12a, b and the respective fifth track sections E on opposite sides of the selector drum 14, a projection 21 of the selector drum 14 (see FIG. 3) is moved in front of a blocking portion 13 (most clearly illustrated in FIG. 6b). Such features engage with each other when the shift shaft 18 has been rotated halfway towards the rotational position in which sixth gear would be engaged (in this example 13.5 degrees away from the rotational position in which fifth gear is engaged).

Cooperation between the projection 21 and blocking portion 13 as illustrated in FIG. 6b prevents further rotation of the shift shaft 18 in the direction of the sixth gear rotational position. Ceasing to apply torque to the shift shaft 18 upon encountering this blocking condition will cause the biasing mechanism to urge the selector drum 14 and shift shaft 18 back into their original fifth gear positions.

Had a negative torque condition not existed in the transmission to during rotation of the shift shaft 18 from the fifth toward the sixth gear rotational position such blocking would not have occurred. The leftmost dog hub 3 would not have been loaded and so would have been caused by the associated selector drum 14 upon twisting the shift shaft 18 to be moved out of engagement with the fifth gear 23 and into engagement with the sixth gear 23, whereby during such movement the selector drum 11 would have remained in its rest position along the shift shaft 18.

Furthermore it is here stated that although the transmission to is configured to block upshifts in a negative torque condition, downshifts however are not blocked in such a negative torque condition and persons skilled in the art having knowledge of WO2016/055304A1 will understand how rotating the shift shaft 18 in the opposite direction will cause sequential downshifts to occur.

Pre-Synchronisation Configuration

Figure 7:
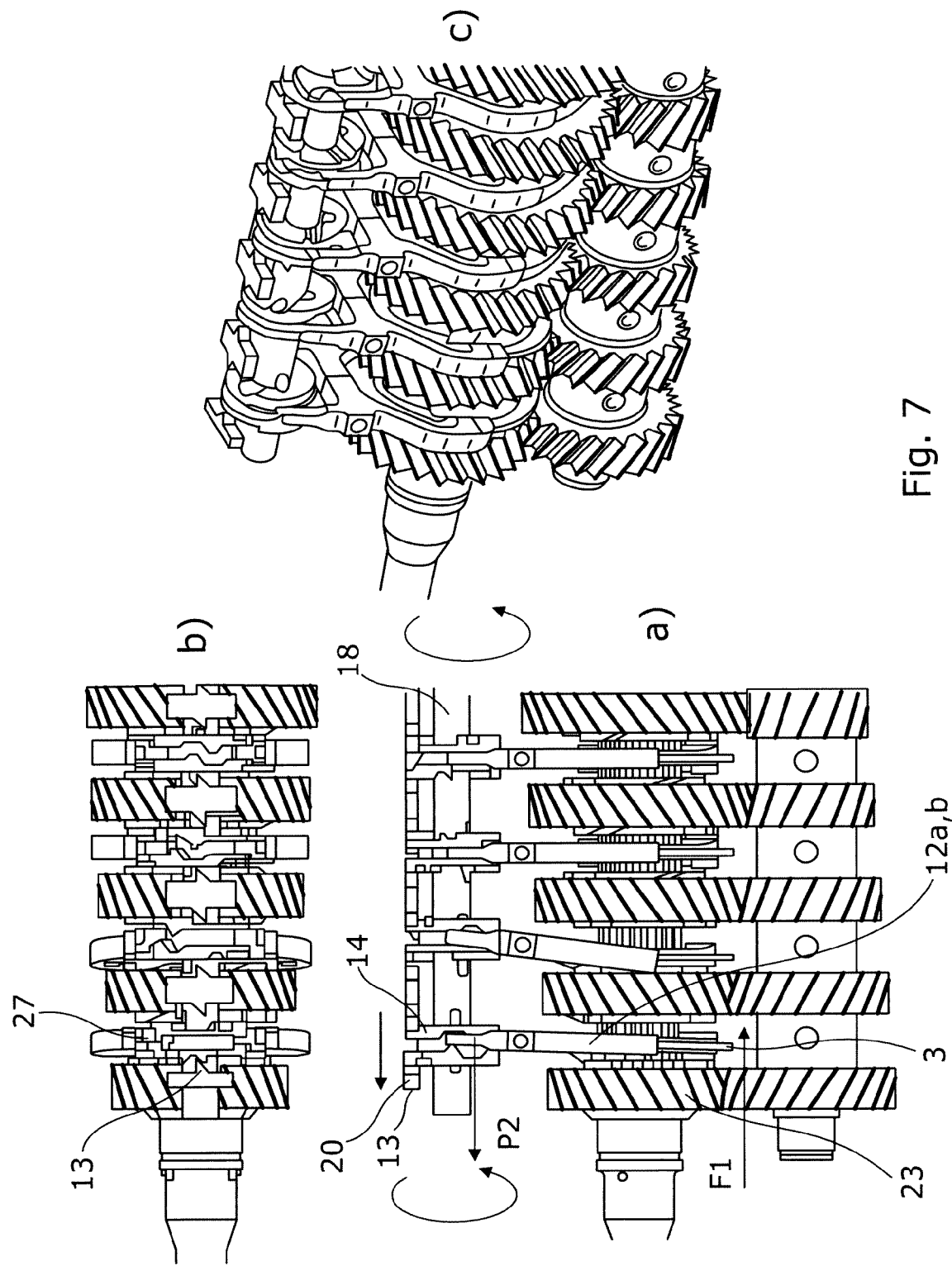
FIGS. 7a to 7c schematically illustrate part of the transmission in FIG. 2 after an upshift to a sixth gear configuration while a positive torque condition exists and before synchronization has occurred.

FIGS. 7a-c show the spatial relationship between transmission components when the shift shaft 18 has been fully rotated into the sixth gear rotational position during a positive torque condition of the transmission to. For the illustrated leftmost dog hub 3, in this arrangement the pins 19 extending from the shift arms 12a,b are each located in a seventh track section denoted G in FIG. 5 which extends parallel circumferentially around the selector drum 14 to the aforementioned first, second and fourth track sections A, B and D. Astute readers, however, will appreciate that upon sliding the leftmost dog hub 3 in FIGS. 7a-c into engagement with the sixth gear 23, at the instant of contact between these two components dog teeth on the dog hub 3 may not mesh with dog teeth of the gear 23.

In such a situation a degree of synchronisation may first be required before such teeth move into meshing engagement during a positive torque condition of the transmission 10. Initially therefore interaction between dog teeth on the sixth gear 23 and dog teeth on the dog hub 3 may cause a force to be exerted on the shift arms 12a,b along the direction F1 in FIG. 7a. As a result the pins 19 extending into the track 20 may exert a force along the direction F2 on the selector drum 14, thereby causing the selector drum 14 to be urged away from its rest position against the biasing mechanism.

A blocking condition is not encountered, however, because while upshifting from fifth to sixth gear during a positive torque condition the selector drum 14 is moved such that when the shift shaft 18 is in its sixth gear rotational position a recess 27 (see FIG. 3) is aligned with the adjacent blocking portion 13. Moreover aligning the blocking portion 3 with the recess 27 enables the selector drum 14 to be moved along the length of the shift shaft 18 without blocking the upshift operation from fifth to sixth gear during a positive torque condition of the transmission 10. This is because during translational movement of the shifting drum 14 prior to synchronisation as described above the blocking portion 13 is received within the recess 27 (most clearly illustrated in FIG. 7b). After synchronisation has occurred however and sixth gear is fully engaged the selector drum 14 is caused to move back long the shift shaft 18 into its rest position by the biasing mechanism.

In other words the recess 27 enables the shift shaft 18 to be fully rotated into the sixth gear rotational position during a positive torque condition of the transmission 10 before synchronisation with the sixth gear has fully occurred.

Blocking Downshift in a Positive Torque Condition

How a downshift can be blocked during a positive torque condition of the transmission 10 will now be described. Moreover, in a forward driving condition of a vehicle with throttle applied a positive torque condition exists in the transmission 10. For the transmission described in WO2016/055304A1 a downshift can be pre-selected during a positive torque condition. Particularly in the case of a gearbox which is manually operated, pre-selection of a gear could lead to an engine over speed occurring.

Looking at FIGS. 8a-c the shift shaft 18 has been rotated in the direction of the rotational position in which fifth gear would be engaged were the transmission in a negative torque condition and were the blocking operation about to be described not to occur. In a positive torque condition the left most dog hub 3 in FIGS. 8a-c is loaded and so cannot easily be separated from the sixth gear 23 during rotation of the shift shaft 18 as described in WO2016/055304A1 which is primarily due to friction between inter-engaging dog teeth. Therefore, with continued reference to FIGS. 8a-c, during rotation of the shift shaft 18 from the sixth to fifth gear rotational position the pins 19 extending from the shift arms 12a into the track 20 of the left most selector drum 14 are each caused to ride along a sixth, slanted, part of the track F during the first half of the twisting operation towards the fifth gear rotational position (see FIG. 5—in this example the first 13.5 degrees of rotation away from the sixth gear rotational position).

In a positive torque condition of the transmission 10, however, the leftmost dog hub 3 in FIGS. 8a-c remains loaded and in positive engagement with the sixth gear 23 while the shift shaft 18 is twisted. As a result this causes the selector drum 14 to be urged along the length of the shift shaft 18 against the aforementioned biasing mechanism when an attempt is made to downshift from sixth to fifth gear by twisting the shift shaft 18.

In more detail, during movement of the left most selector drum 14 in FIGS. 8a-c, the rotational aspect thereof being due to torque exerted by the shift shaft 18 and the translational aspect thereof being due to a reaction force between the pins 19 extending from the shift arms 12a, b and the respective track sections F, a projection 21 on the other side of the selector drum 14 to that heretofore described (see FIG. 3) is moved in front of another blocking portion 13 (most clearly illustrated in FIG. 8b). Such features engage with each other when the shift shaft 18 has been rotated halfway towards its fifth gear rotational position (in this example 13.5 degrees away from the rotational position in which sixth gear is engaged).

Cooperation between the projection 21 and blocking portion 13 as illustrated in FIG. 8b prevents further rotation of the shift shaft 18 in the direction of the fifth gear rotational position. Ceasing to apply torque to the shift shaft 18 upon encountering this blocking condition will cause the biasing mechanism to urge the selector drum 14 and shift shaft 18 back into their original sixth gear positions.

Although the foregoing was restricted to a discussion of movement of the leftmost selector drum 14 in FIGS. 8a-c, movement of the immediately adjacent selector drum 14 during an attempted downshift will now be discussed. FIG. 9 illustrates the position of the heretofore mentioned pins 19 along the length of the respective track patterns 20 of both such selector drums 14 when the attempted downshift blocking condition occurs. In other words FIG. 9 shows the position of the pins 19 along the length of the respective track patterns 20 of the two selector drums 14 that are annotated in FIG. 8b.

As will be appreciated, the track patterns illustrated in FIG. 9 are similar although they are angularly offset relative to each other around the shift shaft 18 in order to cause the appropriate movement of dog hubs 3 upon rotating the shift shaft 18. The key point here though is that when attempting a downshift from sixth to fifth gear during a positive torque condition of the transmission 10, the pins 19 of the leftmost selector drum 14 each move along a sixth, slanted, section of track F before the blocking condition is encountered, whereas the pins 19 of the immediately adjacent selector drum 14 each move along a ninth, non-slanted, section of track I which is aligned with heretofore described track sections A, B. Thus upon attempting to make a downshift during a positive torque condition of the transmission 10, upon twisting the shift shaft 18 (specifically during the first 13.5 degrees of rotation before a blocking condition occurs) the shift arms 12a, 12b of the dog hub 3 mounted in operative relation to the track on the right in FIG. 9 will not have moved and so will not be biased towards the fifth gear 23.

Based on the foregoing it will be understood that during a positive torque condition of the transmission 10, upon making an attempted downshift that is subsequently blocked neither dog hub 3 of the lower gear 23 attempted to be engaged will come into contact with that gear 23. Moreover this is because the dog hub 3 of the higher gear to be disengaged will be held in engagement therewith due to positive engagement of interlocking dogteeth as described in WO2016/055304A1 and because the shift arms 12a, b associated with the lower gear to be engaged will not have been caused to pivot.

Had a positive torque condition not existed in the transmission 10 during rotation of the shift shaft 18 from the sixth to fifth gear rotational positions a blocking condition would not have occurred. The leftmost dog hub 3 in FIGS. 8a-c would not have been loaded and so would have been caused by the associated selector drum 14 upon rotation of the shift shaft 18 to be moved out of engagement with the sixth gear 23 and into engagement with the fifth gear 23, whereby during such movement the selector drum 14 would have remained in its rest position along the shift shaft 18. Also it will be appreciated how the shift arms 12a, b associated with the immediately adjacent selector drum 14 would have been caused to pivot by cooperating with the respective seventh track sections H on opposite sides thereof to urge the dog hub 3 on the right of the fifth gear 23 into engagement therewith.

Furthermore it is here stated that although the transmission 10 is configured to block downshifts in a positive torque condition, upshifts however are not blocked in such a positive torque condition and persons skilled having knowledge of WO2016/055304A1 will understand how rotating the shift shaft 18 in the opposite direction will cause sequential upshifts to occur.

Additional Information

From the foregoing it will be understood that in the example transmission 10 heretofore described the selector drums 14 of the respective shift mechanisms 12 along the length of the shift shaft 18 (see FIG. 2) are successively angularly offset relative to each other by 27 degrees. Thus by twisting the shift shaft 18 the respective tracks 20 of these selector drums 14 cause the appropriate movement of dog hubs 3 for engaging different gear ratios at different angular positions of the shift shaft 18. From the details provided herein persons skilled in the art will understand how this is achieved and so a detailed description of how each respective gear ratio is caused to be selected and deselected is not provided. Furthermore, from the details provided herein persons skilled in the art will understand how each respective shift mechanism 12 is able to block upshifts during a negative torque condition of the transmission 10 and downshifts during a positive torque condition of the transmission 10 and so a separate description of each respective shifting mechanism 12 is not provided.

One additional point to discuss however is as follows. How an upshift between fifth and sixth gear during a negative torque condition of the transmission 10 is blocked has already been explained, whereas based on the forgoing paragraph it will be understood that a similar operation takes place when attempting to make an upshift from fourth to fifth gear during a negative torque condition. In particular, looking at FIG. 9, upon rotating the shift shaft 18 away from the fourth gear rotational position towards the fifth gear rotational position, the pins 19 cooperating with the track on the right in FIG. 9 move along the fifth, slanted, track section denoted E and cause the associated selector drum 14 to move along the shift shaft 18 and a blocking condition to occur, similarly as depicted in FIG. 6*b*. However during such rotation of the shift shaft 18 the pins 19 on the immediately adjacent shifting drum 14 associated with the other dog hub 3 of the fifth gear 23 to be engaged will have been restricted to movement within the respective track section denoted B.

Thus during a negative torque condition of the transmission 10, upon attempting to make an upshift neither dog hub 3 of the higher gear 23 attempted to be engaged will come into contact with that gear 23. Moreover this is because the dog hub 3 of the lower gear to be disengaged will be held in engagement therewith due to positive engagement of interlocking dogteeth as described in WO2016/055304A1 and because the shift arms 12*a*, *b* associated with the other dog hub 3 of the higher gear to be engaged will not have been caused to pivot.

It will be appreciated that whilst various aspects and embodiments of the presently disclosed subject matter have heretofore been described, the scope of the presently disclosed subject matter is not limited to the embodiments set out herein and instead extends to encompass all or most arrangements, and modifications and alterations thereto, which fall within the spirit and scope of the appended claims.

For instance the angular dimensions in FIGS. 5 and 9 are not essential and are used as an example. Persons skilled in the art will appreciate that the transmission 10 could be configured to exhibit different angular dimensions to those illustrated and mentioned herein provided the same effect is achieved (blocking up-shifts in a negative torque condition of the transmission 10/blocking down-shifts in a positive torque condition of the transmission 10).

It will thus be understood that in other embodiments the selector drums 14 of the respective shift mechanisms 12 along the length of the shift shaft 18 (see FIG. 2) need not necessarily by angularly offset relative to each other by 27 degrees as in the example embodiment described in detail in this specification.

The blocking portions 13 described herein could be shaped differently. For example instead of being wedge shaped as illustrated they could instead be more block shaped e.g. square or rectangular shaped protrusions. The same goes for features of the heretofore described selector drums 14, specifically the recesses 27 and projections 21, which could be differently shaped so long as they achieve the blocking effects described herein. The projections 21 for example could also be more block shaped e.g. square or rectangular in nature. Similarly the recesses 27 could be more square-like instead of being essentially V-shaped.

With reference to FIG. 3*a* the top of each projection 21 aligns with the side of the selector drum 14. It will also be noted that one side of each projection 21 defines a side surface of the adjacent V-shaped recess 27, whereas the other side of the projection 21 defines a side surface of another adjacent recess which is the space in which a blocking portion 13 is received in a blocking condition (see FIGS. 6*b* and 8*b*). In another manner of speaking, the projection 21 exists within a cavity and splits it in two, one part being the V-shaped recess 27 and the other part being the space within which a blocking portion 13 is received in a blocking condition. In other embodiments however this need not necessarily be the case and the projections 21 may instead extend from the side of the selector drum 14 without the presence of any such recesses. In such embodiments the space on one side of the projections will act like the aforementioned V-shaped recesses 27 and be able to receive a blocking portion 13 in a pre-synchronisation condition, whereas the other side of the projections will act as the space in which a blocking portion 13 is received in a blocking condition.

ALTERNATIVE EMBODIMENT

For some embodiments of the transmission it is desirable to block down shifts while positive torque is transmitted or block up shifts when negative torque is transmitted but to allow the shift to occur immediately that the dog hub is released by the torque transmitted either being substantially reduced to zero or reversed instead of holding the shift mechanism in the block position.

Figure 10:
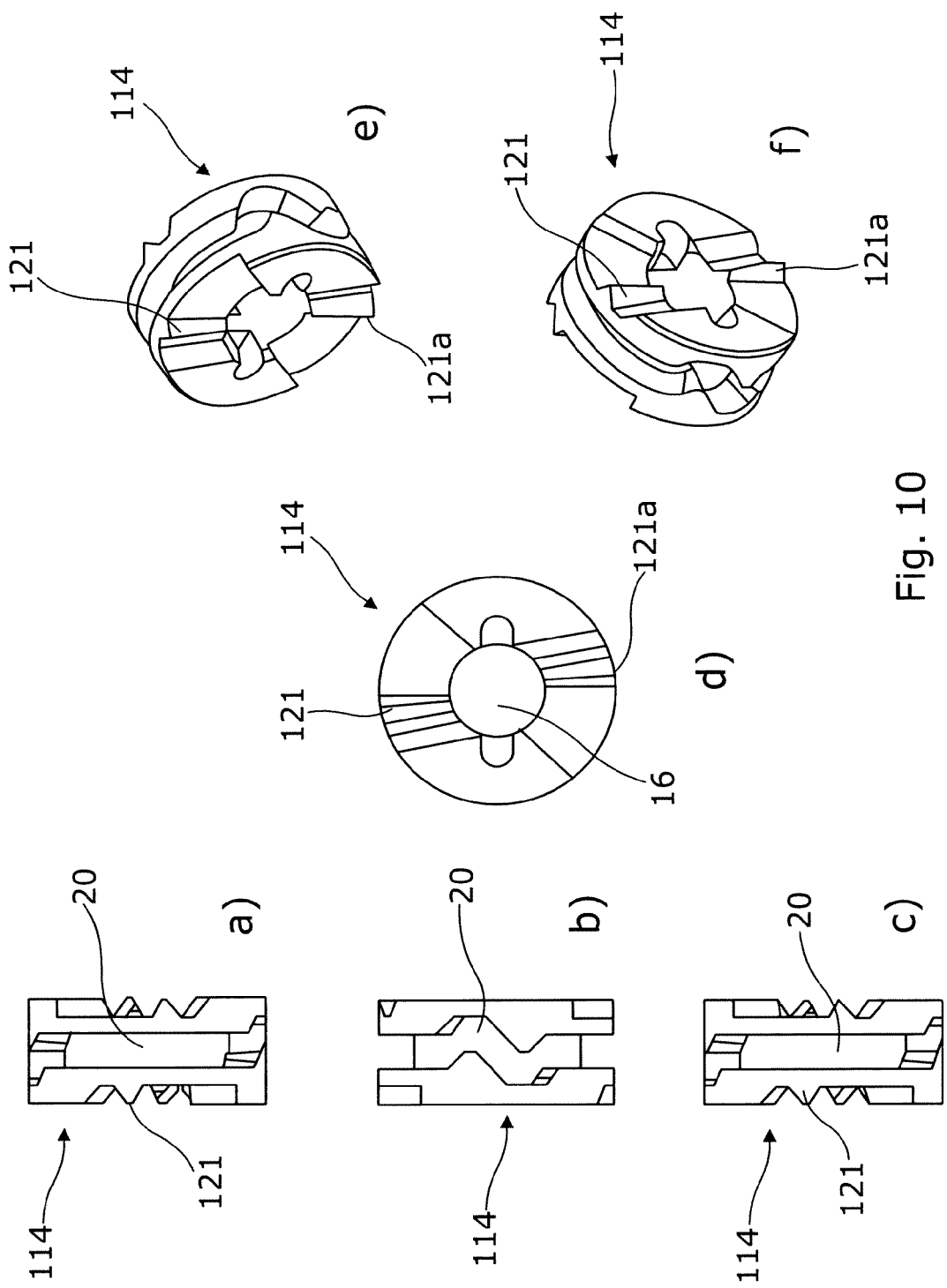
FIGS. 10a to 10f schematically illustrate a selector drum with an alternative form of blocking features from various angles.

FIG. 10 shows an alternative selector drum 114. The same reference numerals will be used for features that are common with previous selector drum 14. As before, the selector drum includes a track 20 defined by the selector drum 114 which extends at least partially around an outer perimeter of the selector drum 114. The track 20 allows movement of the shift arms 12*a*, *b* of the associated shift mechanism 12. The selector drum 114 also includes an aperture 16 for receiving the shift shaft 18, as previously described. The selector drum 114 further includes a projection 121, which performs a similar function to the projection 21 of the previous selector drum 14. Unlike the projection 21 of an embodiment shown in FIG. 3 which has one face inclined to the axis of the shift shaft 18 and one face parallel to the axis of the shift shaft 18, the projection 121 of another embodiment has two inclined faces. The two faces are inclined with respect to a central longitudinal axis of the shift shaft 18. Thus, the two faces are angled with respect to the axis of the shift shaft 18. The inclined faces are angled towards the axis of the shift shaft 18 and meet at a common edge. Thus, the two inclined faces are angled towards each other and so the two faces are joined together forming a ridge. The ridge projects along a longitudinal axis of the shift shaft 18 and extends in a direction perpendicular to the longitudinal axis of the shift shaft 18. The ridge therefore projects axially. The ridge also extends transversely, which may be a radial or substantially radial transverse extension. The selector drum 114 has a projection 121 on either side of the track 20, as can be seen in FIG. 10.

Figure 11:
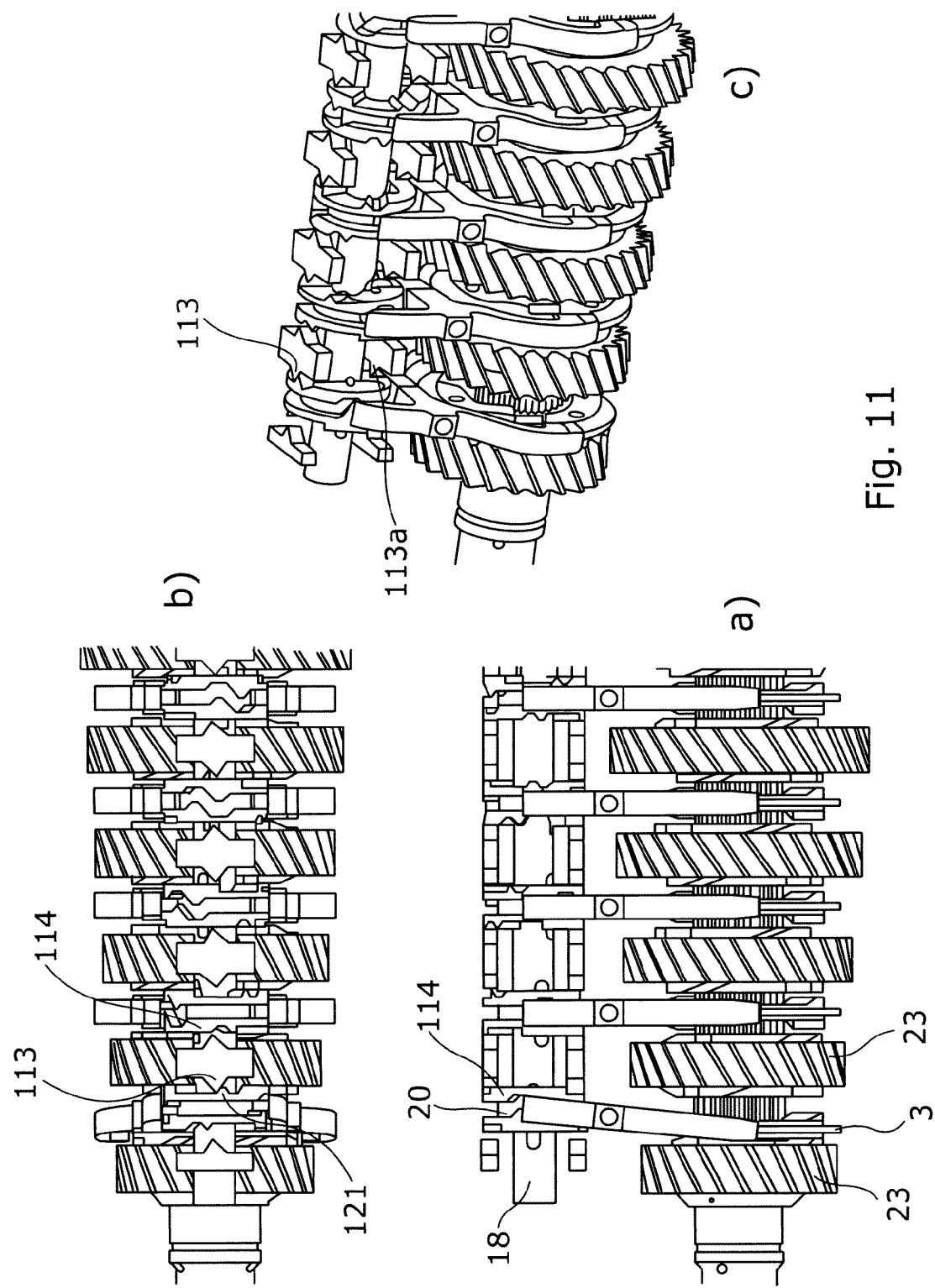
FIGS. 11a to 11c schematically illustrate part of the transmission with the alternative selector drum of FIG. 10 during a downshift from sixth to fifth gear while a positive torque condition exits in the transmission.

The projection 121 of the selector drum 114 engages with a blocking portion 113 fixed to the case of the gearbox, which is similar to that of the embodiment of FIG. 2. Again, the same reference numerals will be used to denote the same features. The blocking portion 13 of an embodiment, shown in FIG. 2, has one face inclined to the axis of the shift shaft 18 and one face parallel to the axis of the shift shaft 18. However, the blocking portion 113 of the other embodiment includes two inclined faces, as shown in FIG. 11. The two faces are inclined with respect to a central longitudinal axis of the shift shaft 18. Thus, the two faces are angled with respect to the axis of the shift shaft 18. The inclined faces are angled towards the axis of the shift shaft 18 and meet at a common edge. Thus, the two inclined faces are angled towards each other and so the two faces are joined together forming a ridge. The ridge projects along a longitudinal axis of the shift shaft 18 and extends in a direction perpendicular to the longitudinal axis of the shift shaft 18. The ridge therefore projects axially. The ridge also extends transversely, which may be a radial or substantially radial transverse extension.

The engaging face of the projection 121 and the corresponding engaging face of the blocking portion 113 are on a plane which is inclined to the axis of rotation of the selector drum 114. The torque applied to the shift shaft 18 when attempting a blocked shift is reacted at this angled interface.

As before, the rotation of the selector drum 114 will be blocked while the dog hub 3 is held in engagement. However, if a torque reversal or reduction occurs, releasing the dog hub 3 and allowing the selector drum 114 to move along the shift shaft 18, then the projection 121 of the selector drum 114 will be able to ride over the blocking portion 113 allowing the selector drum 114 and the shift shaft 18 to rotate and complete the gear shift. Therefore, due to the angled nature of the interface, the projection 121 and blocking portion 113 are able to move past each other. This means that the shift mechanism will no longer be held in the block position mid-way between gears when a reversal of torque which releases the dog hub occurs.

It can be recognised that in an embodiment shown in FIG. 6 once a blocking condition has occurred due to an adverse torque condition further rotation of the selector drum 14 and shift shaft 18 is prevented. The application of adverse torque to the shift shaft 18 must then be stopped which then allows the biasing mechanism to urge the selector drum 14 and shift shaft 18 back into its previous, pre-gear shift position. Torque in the reverse condition can then be applied to the shift shaft 18 and the gear shift is allowed to take place, as described previously.

In this case however, the selector drum 114 does not need to return to its original pre-gear shift position before the gear shift can be completed. Instead, as soon as the adverse torque condition has been reversed, the selector drum 114 and shift shaft 18 are allowed to continue to rotate from the blocked position into the next sequential gear. This is as a result of the operative or engaging faces on both the projection 121 and blocking portion 113 being inclined to one another, meaning they can slide relative to each other. The projection 121 and blocking portion 113 are therefore able to slide past each other which allows the gear shift to take place. Thus, inclined operative faces allow relative sliding movement between the selector drum 114 and gear casing when the adverse torque condition has been reverse.

Thus, instead of holding the shift mechanism in the block position, the gear shift is allowed to occur as soon as the dog hub 3 is released.

It should be noted that the angled, or inclined, face 121 of the projection 121 on the selector drum 114 will cause an axial force to be imparted to the selector drum 114 when it engages with the blocking portion 113. This will tend to misalign the selector drum 114 on the shift shaft 18 and cause it to bind and so possibly still prevent the shift, even after the dog hub 3 is released. To prevent this, a second set of blocking portions 113a are provided in the gear casing, as shown in FIG. 11c, and a second set of projections 121a are provided on the selector drum 114, as shown in FIG. 10e.

Figure 12:
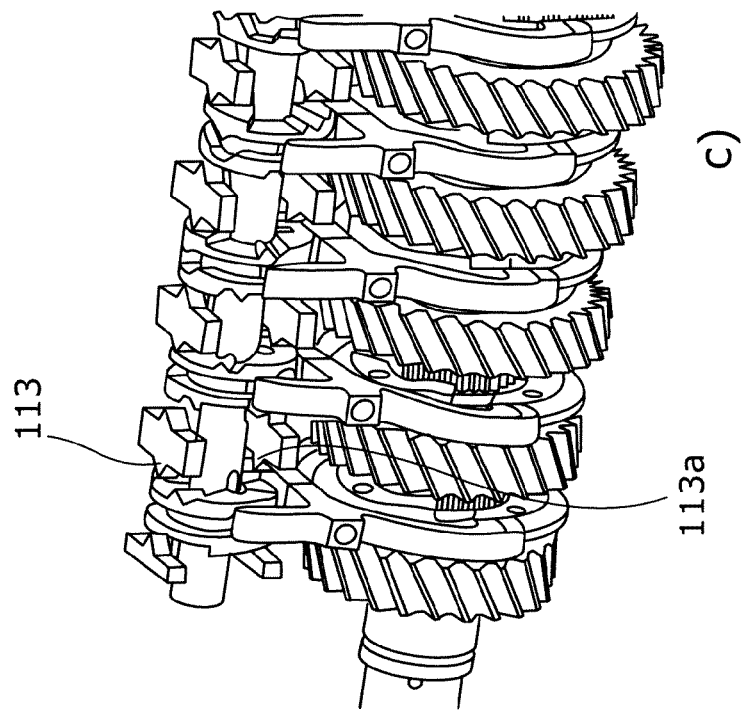
FIGS. 12a to 12c schematically illustrate part of the transmission with the alternative selector drum of FIG. 10 after an upshift to a sixth gear configuration while a positive torque condition exists and before synchronization has occurred.
Figure 12:
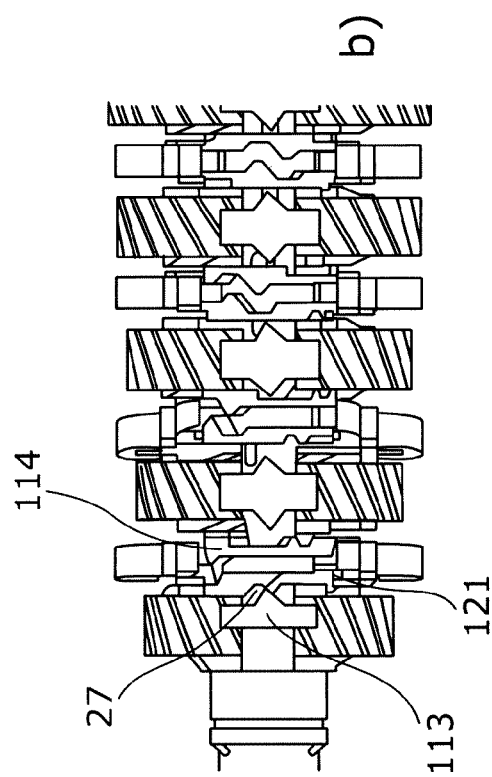
Figure 12:
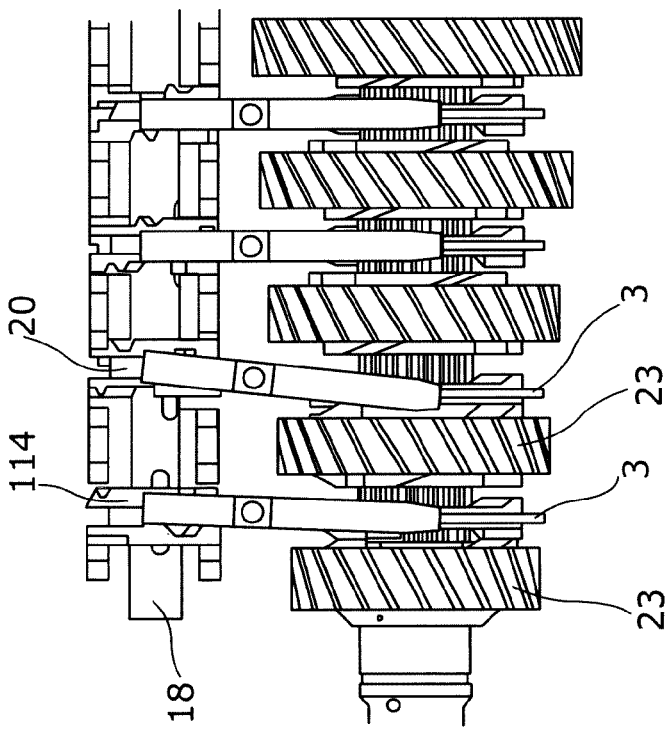

The first set of projections 121 and second set of projections 121a are diametrically opposed to each other. Similarly, the first set of blocking portions 113 and the second set of blocking portions 113a are diametrically opposed to each other. Thus, each pair of features is positioned substantially opposite each other around the circumference of the shift shaft 18. As is shown in FIG. 10e, the first 121 and second 121a set of projections on the selector drum 114 are positioned substantially 180° apart from each other with respect to the axis of rotation of the selector drum 114. Similarly, as is shown in FIG. 12, the first 113 and second 113a set of blocking portions are positioned substantially 180° apart from each other with respect to the axis of the shift shaft 18.

Positioning the pair of projections 121, 121a and the pair of blocking portions 113, 113a substantially opposite to each other with respect to a central axis ensures that the forces are balanced either side of the axis of the shift shaft 18. This avoids misalignments and ensures the free movements of the components without binding. This may also improve the overall shift quality of the transmission system.

FIGS. 12a to 12c schematically illustrate part of the transmission with the alternative selector drum 114 of FIG. 10 after an upshift to a sixth gear configuration while a positive torque condition exists and before synchronisation has occurred. As can be seen, the blocking portion 113 enters the recess 27 as for an embodiment.

FIGS. 13a to 13f schematically illustrate a selector drum 214 with a second alternative form of blocking features from various angles. The same reference numerals will be used for features that are common with previous selector drum 14. As before, the selector drum 214 includes a track 20 defined by the selector drum 214 and an aperture 16 for receiving the shift shaft 18, as previously described. In previous embodiments, the blocking feature on the selector drum has been a projection. In this embodiment, the blocking feature is a face 221 of the selector drum 214. The face 221 is defined by a portion of the external surface of the selector drum 214. Thus, the face 221 extends around a portion of the external surface of the selector drum 214. The plane of the face 221 is perpendicular to the axis of rotation of the selector drum 214. The face 221 has an axial width that is less than an axial width of a portion of maximum width 222 of the external surface of the selector drum 214. The face 221 has an axial width that is greater than an axial width of a portion of minimum width 220 of the external surface of the selector drum 214.

Figure 14:
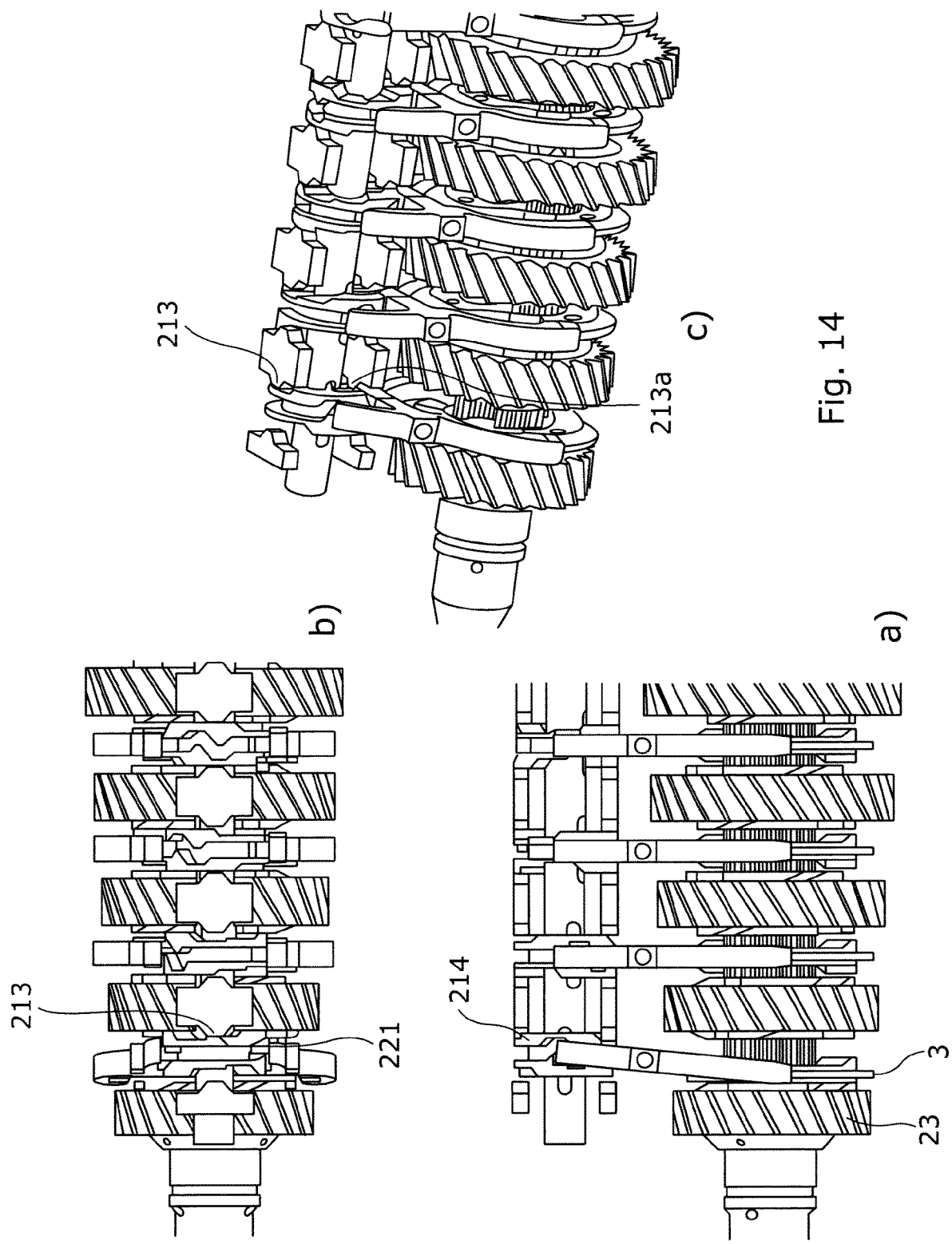
FIGS. 14a to 14c schematically illustrate part of the transmission with the alternative selector drum of FIG. 13 during a downshift from sixth to fifth gear while a positive torque condition exits in the transmission.

Similarly to previous embodiments, the face 221 of the selector drum 214 is configured to engage with a blocking portion 213 fixed to the case of the gearbox, as shown in FIG. 14. The blocking portion 213 of this embodiment is similar to the blocking portion 113 of the other embodiment in that it includes two faces that are inclined with respect to the axis of the shift shaft 18, towards the axis of the shift shaft 18. However, in this case the two inclined faces do not meet each other and so do not share a common edge. Instead, there is a substantially straight portion which extends between the two inclined faces, perpendicular to the shift shaft 18 axis. Thus, instead of the two inclined faces meeting together to form a ridge, as shown in FIG. 11, there is an intermediate flat surface which extends between the two inclined surfaces. The plane of the surface is perpendicular to the axis of the shift shaft 18.

The face 221 of the selector drum 214 is configured to engage with the substantially straight portion of the blocking portion 213, as is clear from FIG. 14. Thus, the engagement of these features, that is the selector drum face 221 and the blocking portion 213, is on a plane which is perpendicular to the axis of rotation of the selector drum 214. This means that on its own, the engagement of the selector drum face 221 with the blocking portion 213 does not prevent rotation of the selector drum 214. However at the position of blocking, the pin 19 engaged with the track 20 of the selector drum 214 is in a position mid-way between gears as illustrated in the left hand portion of FIG. 9. The pin 19 is in an angled portion of the track 20 which means that in order for the selector drum 214 to continue rotating, the selector drum 214 must move along the shift shaft 18. This is because the shift arms 12a, b are held stationary by the dog hubs 3 which are themselves being held in engagement by the torque transmitted. However, because of the engagement between the selector drum face 221 with the blocking portion 213, the selector drum 214 is prevented from moving along the shift shaft 18 and so the pin 19 remains in the angled portion of the track 20 in a position mid-way between gears. The rotation of the selector drums 214 and the shift shaft 18 is therefore blocked in the same manner as for the other embodiments.

For completeness, looking at FIG. 14a, the shift shaft 18 has been rotated in a direction in which a downshift to fifth gear would occur. In a positive torque condition, the leftmost dog hub 3 is loaded and so cannot easily be separated from the sixth gear 23 during rotation of the shift shaft 18, which is primarily due to friction between inter-engaging dog teeth. Therefore, during rotation of the shift shaft 18 from the sixth to fifth gear the pins 19 extending from the shift arms 12 into the track 20 of the left most selector drum 214 are each caused to ride along the sixth, slanted part of the track F during the first half of the rotation operation towards the fifth gear position (see FIG. 5).

Since the leftmost dog hub 3 remains loaded and in positive engagement with the sixth gear 23 while the shift shaft 18 is twisted, this causes the selector drum 214 to be urged along the length of the shift shaft 18 against the aforementioned biasing mechanism when an attempted downshift is made.

During movement of the left most selector drum 214, the rotational aspect thereof being due to torque exerted by the shift shaft 18 and the translational aspect thereof being due to a reaction force between the pins 19 extending from the shift arms 12a, b and the respective track sections F, the blocking face 221 on the selector drum 214 is moved in front of the blocking portion 213 of the gear casing. These two features engage with each other when the shift shaft 18 has been rotated halfway towards its fifth gear rotational position, as described previously with reference to FIG. 8.

When attempting a downshift from sixth to fifth gear during a positive torque condition of the transmission 10, the pins 19 of the leftmost selector drum 214 each move along the sixth, slanted, section of track F before the blocking condition is encountered.

Thus, the combination of the cooperation between the blocking face 221 and blocking portion 213 and the pin 19 being in the slanted portion of the track 20 prevents further rotation of the shift shaft 18 in the direction of the fifth gear rotational position.

Figure 8:
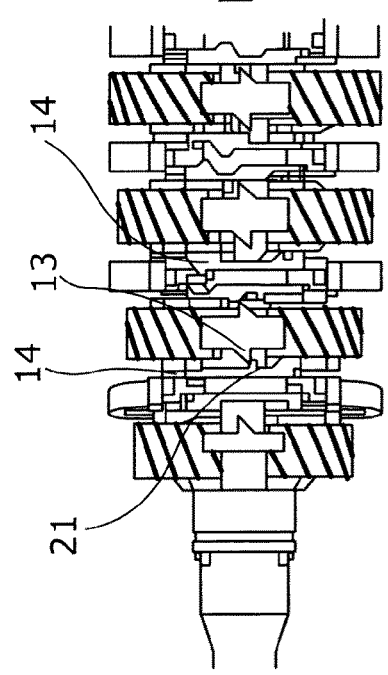
FIGS. 8a to 8c schematically illustrate part of the transmission in FIG. 2 during a downshift from sixth to fifth gear while a positive torque condition exits in the transmission.
Figure 8:
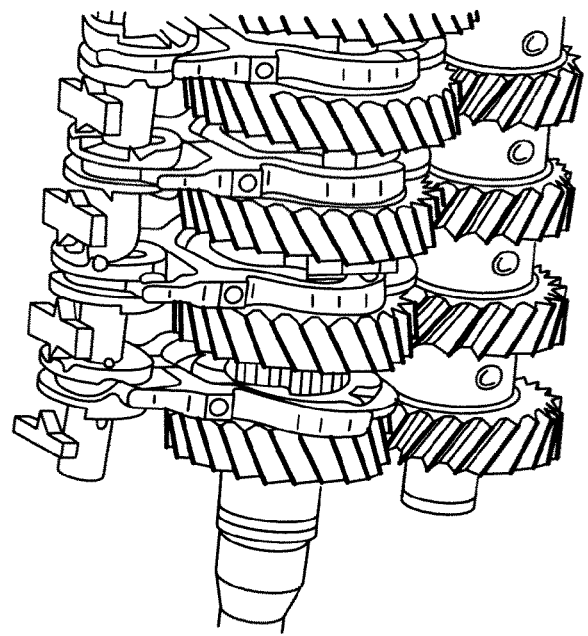
Figure 8:
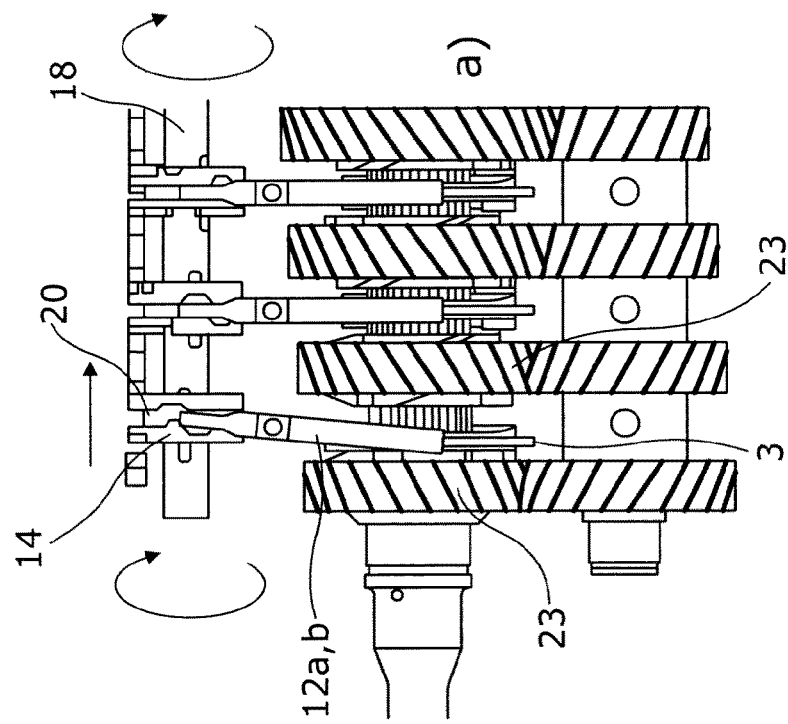
Figure 9:
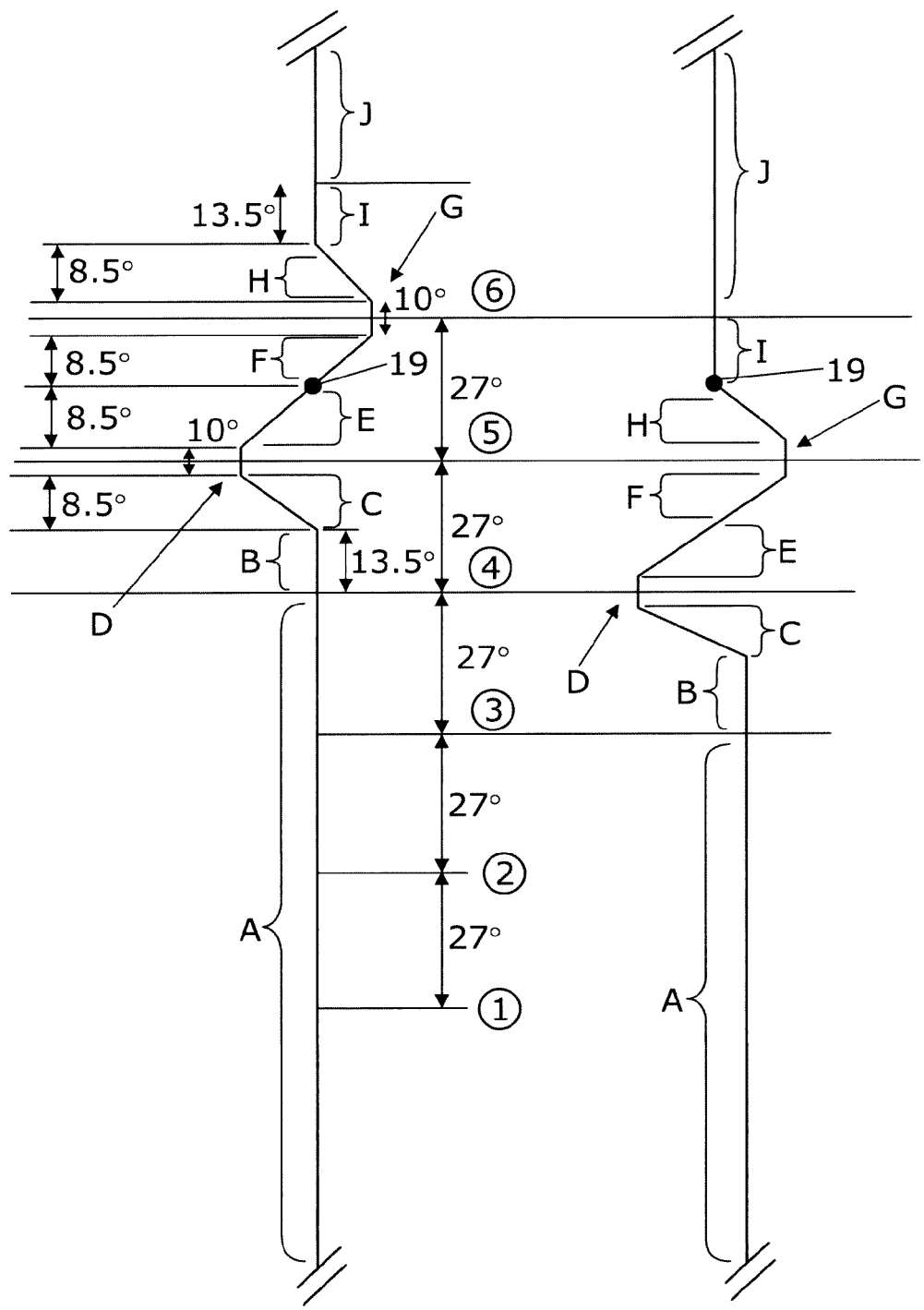
FIG. 9 schematically illustrates a section of the track pattern extending around the left most selector drum in FIGS. 8a to 8c and the immediately adjacent selector drum.

In the embodiment shown in FIG. 8, ceasing to apply torque to the shift shaft 18 upon encountering the blocking condition causes the biasing mechanism to urge the selector drum 14 and shift shaft 18 back into their original sixth gear positions. Torque in the reverse condition can then be applied to the shift shaft 18 and the gear shift is allowed to take place, as described previously.

In this case however, the selector drum 214 does not need to return to its original pre-gearshift position before the gear shift can be completed. Instead, as soon as the adverse torque condition has been reversed, the selector drum 214 and shift shaft 18 are allowed to continue to rotate from the blocked position into the next sequential gear. This is a result of the operative or engaging faces on both the selector drum 214 and blocking portion 213 being able to slide relative to each other. The blocking face 221 and the blocking portion 213 are able to slide past each other which allows the gear shift to take place. Thus, operative faces perpendicular to the axis of rotation of the shift shaft 18 allow relative sliding movement between the selector drum 214 and blocking portion 213 when the adverse torque condition has been reverse.

To improve the stability of the selector drum, the selector drum 214 is provided with first 221 and second 221a sets of blocking faces and the gearbox casing is provided with first 213 and second 213a sets of blocking portions, as in the previous embodiment. The two sets of blocking faces 221, 221a on the selector drum 214 are diametrically opposed to each other. Similarly, the two sets of blocking portions 213, 213a are diametrically opposed to each other. Thus, each pair of features is positioned substantially opposite each other around the circumference of the shift shaft 18. As is shown in FIG. 13e, the first 221 and second 221a set of faces on the selector drum 214 are positioned substantially 180° apart from each other with respect to the axis of rotation of the selector drum 214. Similarly, as is shown in FIG. 14c, the first 213 and second 213a set of blocking portions are positioned substantially 180° apart from each other with respect to the axis of the shift shaft 18.

Figure 13:
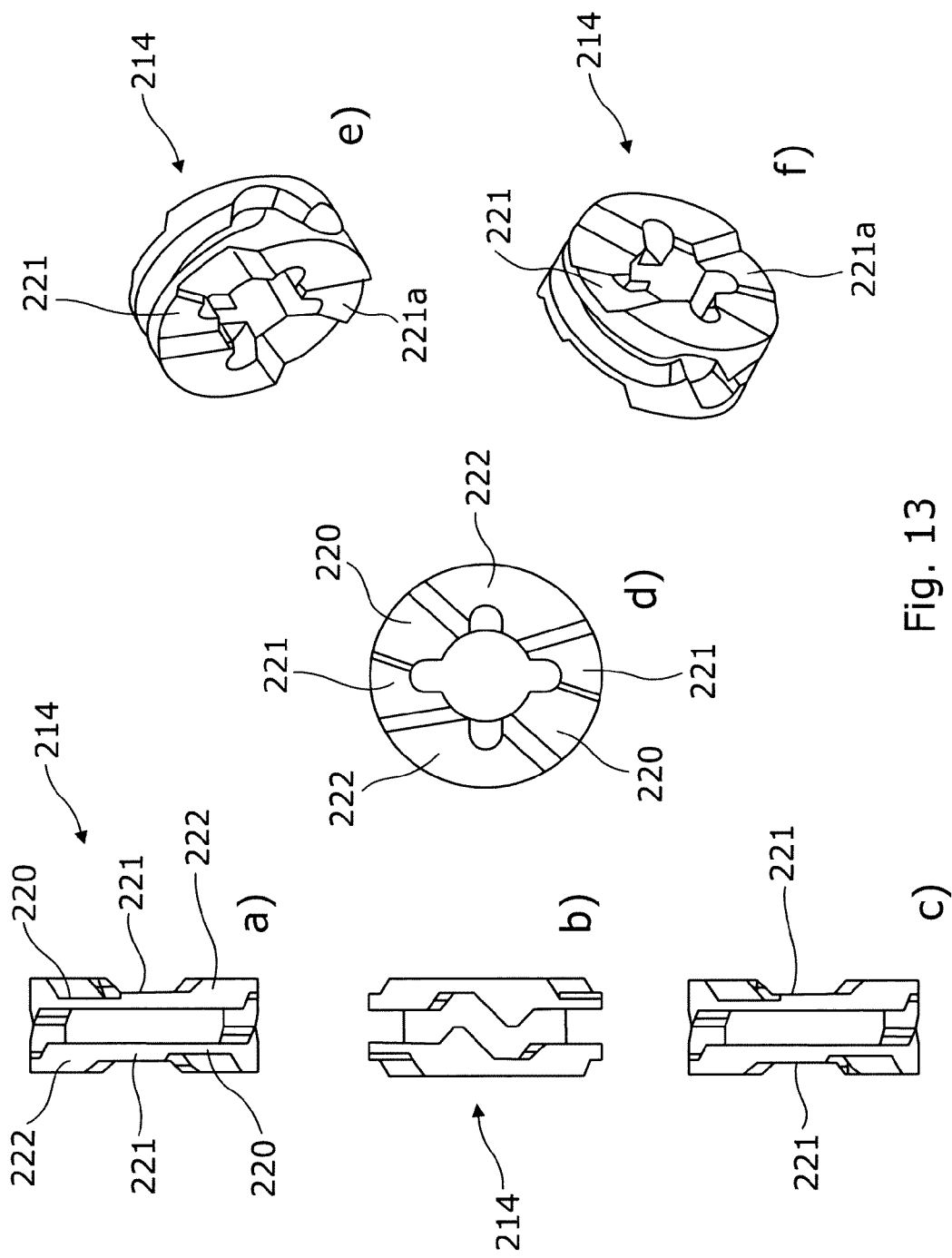
FIGS. 13a to 13f schematically illustrate a selector drum with a second alternative form of blocking features from various angles.
Figure 15:
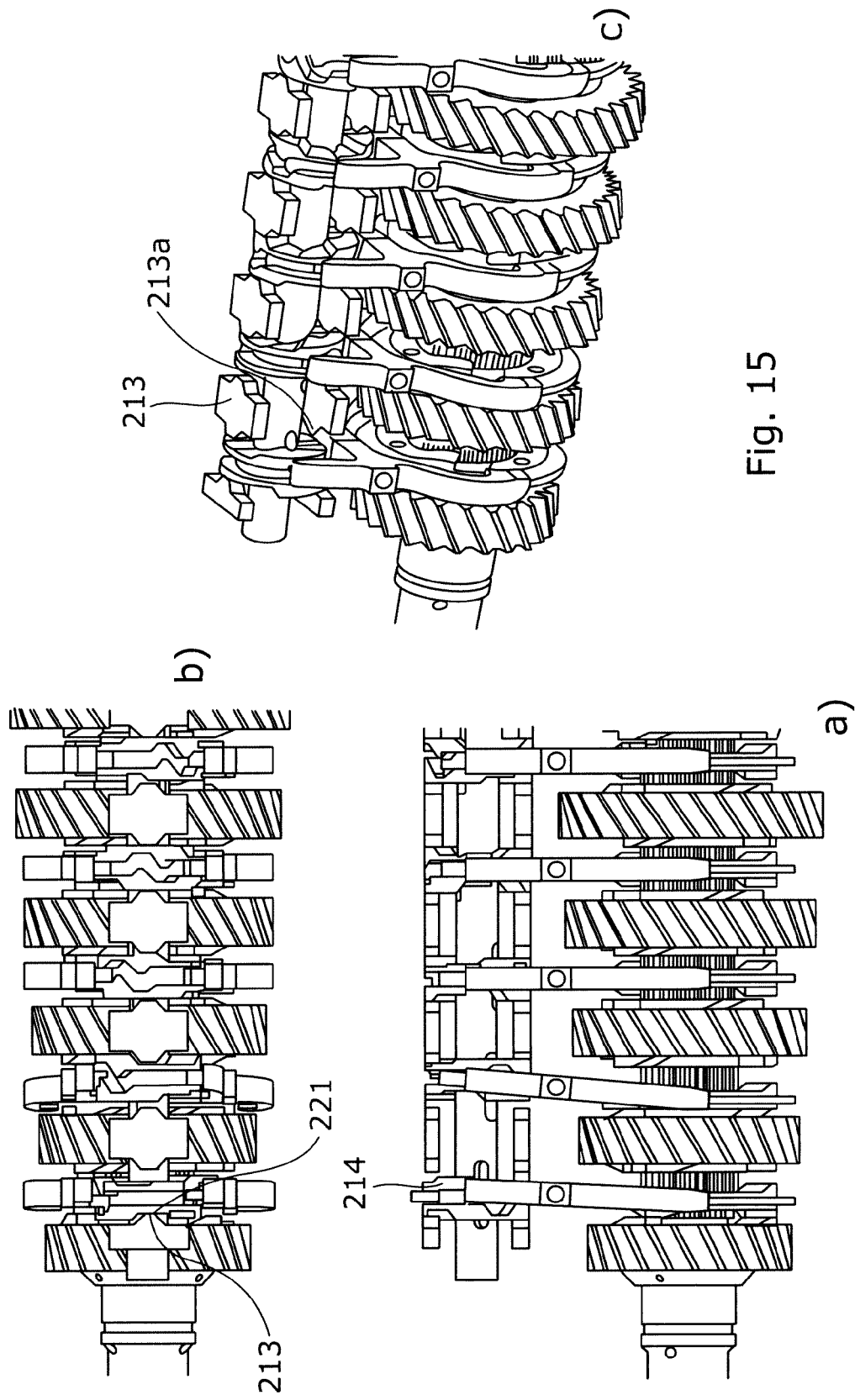
FIGS. 15a to 15c schematically illustrate part of the transmission with the alternative selector drum of FIG. 13 after an upshift to a sixth gear configuration while a positive torque condition exists and before synchronization has occurred.

FIGS. 15a to 15c schematically illustrate part of the transmission with the alternative selector drum 214 of FIG. 13 after an upshift to a sixth gear configuration while a positive torque condition exists and before synchronization has occurred. Note that the blocking portions 213 project into the single cutouts in the sides of the selector drum 214 to allow for the synchronization of the dog hub 3 with the gear to be engaged.

FIGS. 16a to 16c schematically illustrate part of the transmission with the alternative selector drum 214 of FIG. 13 and an alternative blocking portion 313 on the gearbox casing during a downshift from sixth to fifth gear while a positive torque condition exits in the transmission. In this case, the blocking portion is a roller 313. The roller 313 is used in place of the blocking portions 213 of the embodiment shown in FIGS. 14-15. The selector drum 214 is the same as that of FIG. 13. That is, the blocking features of the selector drum 214 are the blocking faces 221.

The roller 313 is mounted to a pin which is fixed to the case of the gearbox. The pin extends radially from the axis of the shift shaft 18. The roller 313 is free to rotate around the pin. The use of rollers reduces friction in the mechanism which enhances shift quality. The reduction in friction also allows shallower ramp angles in the tracks 20 around the selector drums 214 to be used without the risk of binding of the mechanism when blocking shifts.

Figure 16:
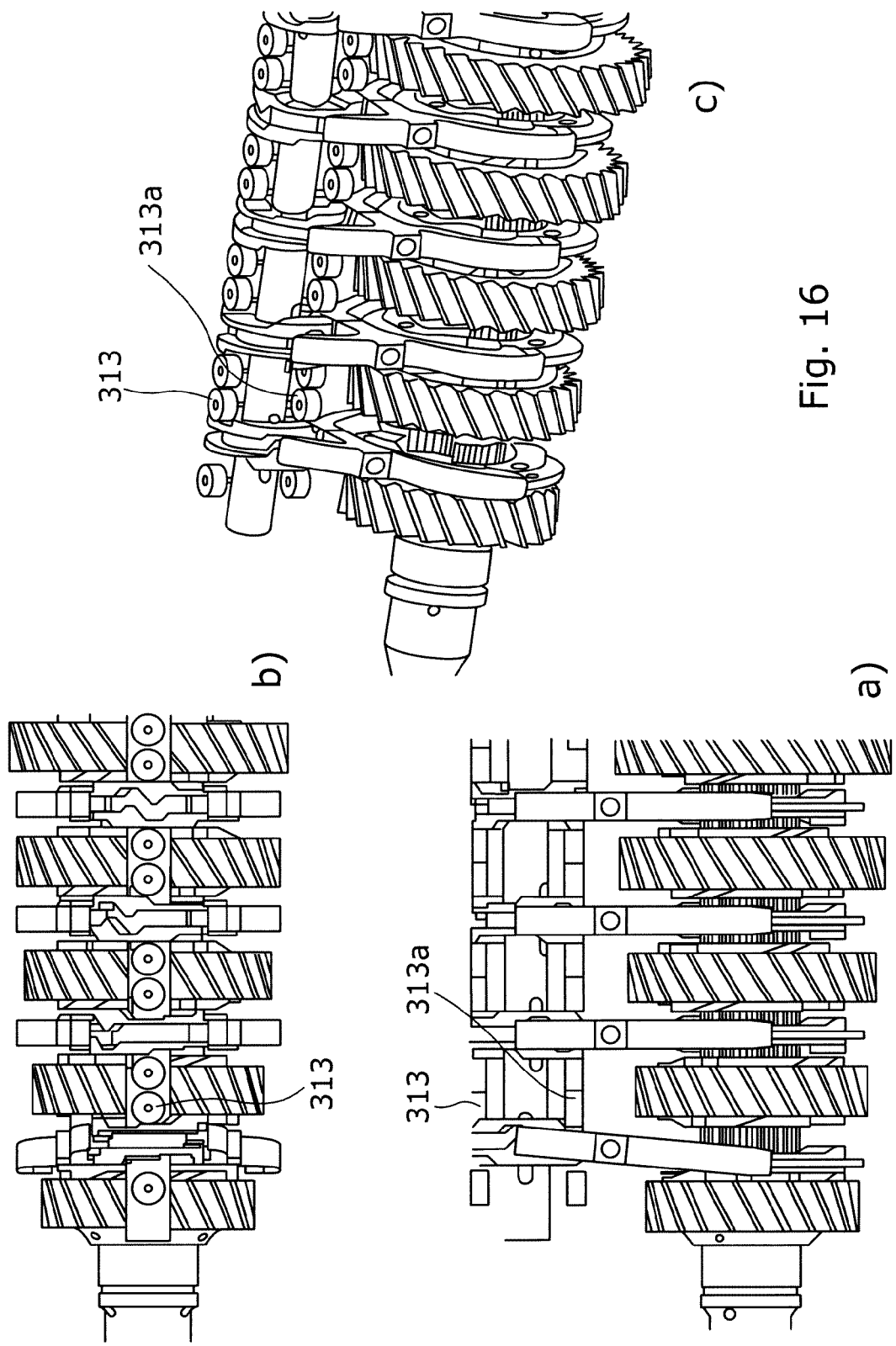
FIGS. 16a to 16c schematically illustrate part of the transmission with the alternative selector drum of FIG. 13 and an alternative blocking portion in the form of a roller during a downshift from sixth to fifth gear while a positive torque condition exits in the transmission.

As with previous embodiments, two blocking features, or rollers, 313 are provided per side for each selector drum 214. That is, two rollers are provided on one side of the selector drum 214, the two rollers being diametrically opposed to each other. Thus, each pair of rollers is positioned substantially opposite each other around the circumference of the shift shaft 18. As is shown in FIG. 16, the pair of rollers 313 are positioned substantially 180° apart from each other with respect to the axis of the shift shaft 18.

Figure 17:
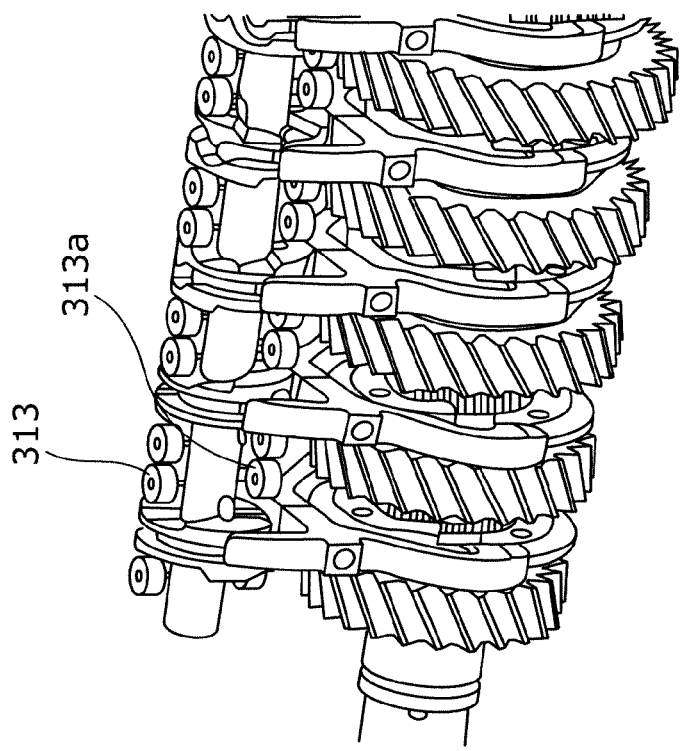
FIGS. 17a to 17c schematically illustrate part of the transmission with the alternative selector drum of FIG. 13 and an alternative blocking portion in the form of a roller after an upshift to a sixth gear configuration while a positive torque condition exists and before synchronization has occurred.
Figure 17:
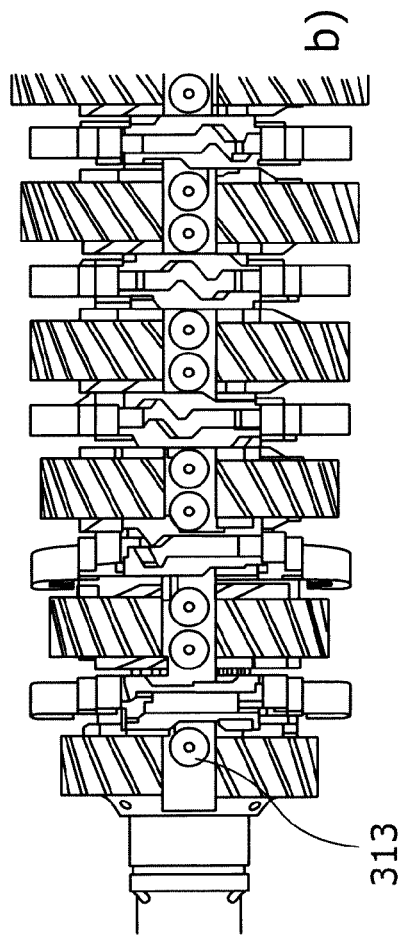
Figure 17:
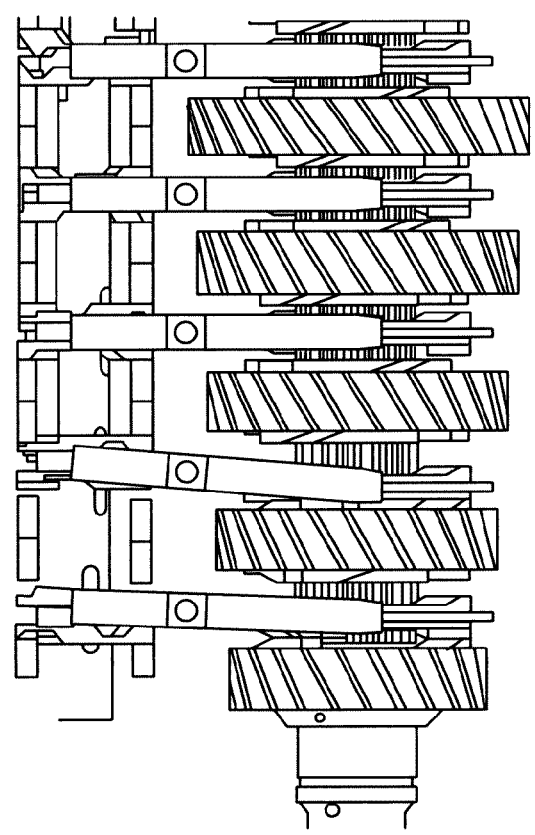

FIGS. 17a to 17c schematically illustrate part of the transmission with the alternative selector drum 214 of FIG. 13 and the alternative blocking portion in the form of rollers 313 after an upshift to a sixth gear configuration while a positive torque condition exists and before synchronization has occurred.

Again, it will be appreciated that whilst various aspects and further embodiments have heretofore been described, the skilled person would understand that the presently disclosed subject matter is not limited to the embodiments set out herein and instead extends to encompass all or most arrangements, and modifications and alterations thereto, provided the same effect is achieved (blocking up-shifts in a negative torque condition/blocking down-shifts in a positive torque condition but allowing the shift to occur immediately that the torque is reduced to zero or reversed instead of maintaining the shift mechanism in the block position).

For example the blocking portions and features of the selector drum could be differently shaped so long as they achieve the blocking and subsequent releasing effects described herein.

The invention claimed is:

1. A transmission having a torque input and a torque output, a plurality of drive members that are selectively engageable for sequentially changing gear ratio between the torque input and the torque output, the transmission also having a shaft provided with at least one shifting feature, the at least one shifting feature comprising:
a drum having a track at least partially around an outer perimeter thereof and arranged such that torque can be transferred to the drum by rotating the shaft, the drum also capable of being moved along a length of the shaft;
a biasing mechanism for urging the drum towards a rest position along the length of the shaft; and
a drive member selector member provided in operative relation to the track, wherein by rotating the shaft, the drive member selector member can be selectively urged into contact with a first drive member for drivingly engaging therewith in a first torque connection or into contact with a second drive member for drivingly engaging therewith in a second torque connection, the first and second torque connections being in opposite directions,
wherein the at least one shifting feature is configured such that when the drive member selector member thereof is drivingly engaged with the first or second drive member thereof in either a positive or negative torque condition of the transmission in use, rotation of the shaft is blocked in one direction whereby a blocking condition occurs part way between an initial rotational position of the shaft and a rotational position in which the next sequentially selectable gear ratio would be caused to be engaged if the torque condition of the transmission was reversed, and
the at least one shifting feature is configured such that when the drive member selector member thereof is drivingly engaged with the first or second drive member thereof in either the positive or negative torque condition of the transmission in use, rotation of the shaft is blocked in one direction whereby the blocking condition occurs and the blocking condition subsequently no longer occurs when the torque condition of the transmission is reversed.

2. The transmission according to claim 1, wherein the at least one shifting feature is configured such that when the drive member selector member thereof is drivingly engaged with the first or second drive member thereof in the positive torque condition of the transmission a downshift to a lower selectable gear ratio is blocked.

3. The transmission according to claim 2 wherein the at least one shifting feature is configured such that when the positive torque condition of the transmission is reversed the downshift to the lower selectable gear ratio is no longer blocked.

4. The transmission according to claim 1, wherein the at least one shifting feature is configured such that when the drive member selector member thereof is drivingly engaged with the first or second drive member thereof in the negative torque condition of the transmission an upshift to a higher selectable gear ratio is blocked.

5. The transmission according to claim 4 wherein the at least one shifting feature is configured such that when the negative torque condition of the transmission is reversed the upshift to the higher selectable gear ratio is no longer blocked.

6. The transmission according to claim 1, wherein the at least one shifting feature is configured such that in a blocking condition thereof a first blocking feature of the drum engages a second blocking feature of the transmission for preventing rotation of the shaft in the direction blocked.

7. The transmission according to claim 6 wherein the first and second blocking features includes respective operative surfaces which are configured to block a transition between a lower and a higher gear ratio when the transmission is in an adverse torque condition and the respective operative surfaces are further configured to allow a subsequent transition between the lower and the higher gear ratio when the transmission is no longer in an adverse torque condition.

8. The transmission according to claim 6 wherein the first blocking feature of the drum includes first and second angled surfaces, and at least one of the first and second angled surfaces is an operative surface configured to engage the second blocking feature of the transmission for preventing rotation of the shaft in the direction blocked.

9. The transmission according to claim 8 wherein the second blocking feature of the transmission includes further first and second angled surfaces, and at least one of the further first and second angled surfaces is an operative surface configured to engage the first blocking feature of the drum for preventing rotation of the shaft in the direction being blocked.

10. The transmission according to claim 8 wherein the operative surface of the first blocking feature lies in a plane which is inclined to a longitudinal axis of the shaft.

11. The transmission according to claim 9 wherein the operative surfaces of the first and second blocking features lie in a plane which is inclined to a longitudinal axis of the shaft.

12. The transmission according to claim 8 wherein the drum includes two of the first blocking features, and such two first blocking features are diametrically opposed to each other.

13. The transmission according to claim 9 wherein the transmission includes two of the second blocking features, and such two second blocking features are diametrically opposed to each other.

14. The transmission according to claim 6 wherein the first blocking feature of the drum includes a blocking face, wherein the blocking face extends around a portion of an external surface of the drum in a plane perpendicular to the axis of the rotation of the drum.

15. The transmission according to claim 8 wherein an operative surface of the first blocking feature defines a bottom of a recess in a side of the drum.

16. The transmission according to claim 6 wherein the second blocking feature of the transmission includes at least one selected from the group consisting of (a) at least one roller, and (b) two rollers which are diametrically opposed to each other.

17. The transmission according to claim 6, wherein the at least one shifting feature is configured such that in a pre-synchronisation condition thereof upon changing gear ratio in use, the second blocking feature is received in a second space on a side of the first blocking feature.

18. The transmission according to claim 6, wherein the second blocking feature of the transmission forms part of a casing of the transmission.

19. A vehicle comprising a transmission according to claim 1.

* * * * *